United States Patent [19]

Lindsay et al.

[11] Patent Number: 5,750,989
[45] Date of Patent: May 12, 1998

[54] SCANNING PROBE MICROSCOPE FOR USE IN FLUIDS

[75] Inventors: Stuart M. Lindsay; Tianwei Jing, both of Tempe, Ariz.

[73] Assignee: Molecular Imaging Corporation, Tempe, Ariz.

[21] Appl. No.: 388,068

[22] Filed: Feb. 10, 1995

[51] Int. Cl.⁶ .................................................. H01J 37/252
[52] U.S. Cl. .................................... 250/306; 250/442.11
[58] Field of Search ................................ 250/306, 307, 250/440.11, 442.11; 73/105

[56] References Cited

U.S. PATENT DOCUMENTS

| | | | |
|---|---|---|---|
| Re. 33,387 | 10/1990 | Binnig | 250/306 |
| Re. 34,331 | 8/1993 | Elings et al. | 250/306 |
| Re. 34,489 | 12/1993 | Hansma et al. | 250/560 |
| 4,343,993 | 8/1982 | Binnig et al. | 250/306 |
| 4,785,177 | 11/1988 | Bosocke | 250/442.1 |
| 4,800,274 | 1/1989 | Hansma | 250/306 |
| 4,806,755 | 2/1989 | Duerig et al. | 250/306 |
| 4,866,271 | 9/1989 | Ono et al. | 250/306 |
| 4,868,396 | 9/1989 | Lindsay | 250/440.1 |
| 4,871,938 | 10/1989 | Elings et al. | 310/328 |
| 4,877,957 | 10/1989 | Okada et al. | 250/306 |
| 4,914,293 | 4/1990 | Hayashi et al. | 250/306 |
| 4,935,634 | 6/1990 | Hansma et al. | 250/306 |
| 4,947,042 | 8/1990 | Nishioka et al. | 250/306 |
| 4,969,978 | 11/1990 | Tomita et al. | 204/153.1 |
| 4,992,728 | 2/1991 | McCord et al. | 324/158 P |
| 4,999,494 | 3/1991 | Elings | 250/306 |
| 5,025,658 | 6/1991 | Elings et al. | 73/105 |
| 5,047,637 | 9/1991 | Toda | 250/306 |
| 5,103,095 | 4/1992 | Elings et al. | 250/306 |
| 5,107,114 | 4/1992 | Nishioka et al. | 250/306 |
| 5,120,959 | 6/1992 | Tomita | 250/306 |
| 5,144,833 | 9/1992 | Amer et al. | 73/105 |
| 5,155,361 | 10/1992 | Lindsay | 250/307 |
| 5,157,251 | 10/1992 | Albrecht et al. | 250/216 |
| 5,189,906 | 3/1993 | Elings et al. | 73/105 |
| 5,200,616 | 4/1993 | Kokawa et al. | 250/306 |
| 5,202,004 | 4/1993 | Kwak et al. | 204/153.1 |
| 5,247,186 | 9/1993 | Toda | 250/561 |
| 5,253,516 | 10/1993 | Elings et al. | 73/105 |

(List continued on next page.)

FOREIGN PATENT DOCUMENTS 6-59004   3/1994   Japan.

OTHER PUBLICATIONS

Jung, et al., "Novel Stationary–Sample Atomic Force Microscope with Beam–Tracking Lens," Electronics Letters, vol. 29, No. 3, pp. 264–265, Feb. 4, 1993.

(List continued on next page.)

*Primary Examiner*—Kiet T. Nguyen
*Attorney, Agent, or Firm*—Killworth, Gottman, Hagan & Schaeff, L.L.P.

[57] ABSTRACT

A microscope suitable for use in atomic force microscopy and scanning tunneling microscopy includes an electrochemical liquid cell. Vertically adjustable supporting mounts extend downwardly from a frame and include magnetic balls to which a sample platform may be attached. At least two adjustment pegs extend downwards from the frame and engage the platform for horizontal adjustment at apertures therethrough. The pegs may be moved out of engagement with the platform to reduce drift. An electrical sensor provides a signal to indicate whether the pegs are in contact with the platform. A bore in the frame is provided through which the chosen scanning head may be inserted so as to engage a sample on the platform. A hermetically sealed chamber may be formed around the sample by a seal between the scanner of the microscope and the frame as well as an enclosure which fits over the bottom of the microscope and engages the frame at an O-ring seal. Scanning heads may be rotated for adjustment. The fluid cell is attached to the sample platform with adjustable magnetic clamps. The cell is easily placed over the sample with no need of separate clamps or screws. Electrochemical control of the potential of either or both of the sample and the force sensing probe is used so as to control interactions between the probe and the sample surface. Contamination of the surface being studied may be controlled by placing the scanning probe and the surface under a protective fluid.

49 Claims, 18 Drawing Sheets

U.S. PATENT DOCUMENTS

| | | | |
|---|---|---|---|
| 5,260,824 | 11/1993 | Okada et al. | 359/368 |
| 5,291,775 | 3/1994 | Gamble et al. | 73/105 |
| 5,294,804 | 3/1994 | Kajimura | 250/561 |
| 5,296,704 | 3/1994 | Mishima et al. | 250/306 |
| 5,307,693 | 5/1994 | Griffith et al. | 73/862.68 |
| 5,314,254 | 5/1994 | Yashar et al. | 384/49 |
| 5,317,153 | 5/1994 | Matsushiro et al. | 250/306 |
| 5,319,960 | 6/1994 | Gamble et al. | 73/105 |
| 5,325,010 | 6/1994 | Besocke et al. | 310/317 |
| 5,357,105 | 10/1994 | Harp et al. | 250/234 |
| 5,363,697 | 11/1994 | Nakagawa | 73/105 |
| 5,381,101 | 1/1995 | Bloom et al. | 250/306 |
| 5,388,452 | 2/1995 | Harp et al. | 73/105 |
| 5,410,910 | 5/1995 | Somlyo et al. | 250/306 |
| 5,438,206 | 8/1995 | Yokoyama et al. | 250/306 |
| 5,461,907 | 10/1995 | Tench et al. | 73/105 |
| 5,468,959 | 11/1995 | Tohda et al. | 250/306 |
| 5,481,521 | 1/1996 | Washizawa et al. | 250/306 |
| 5,481,527 | 1/1996 | Kasanuki et al. | 250/306 |
| 5,497,000 | 3/1996 | Tao et al. | 250/307 |
| 5,500,535 | 3/1996 | Jing | 250/440.11 |
| 5,513,518 | 5/1996 | Lindsay | 73/105 |
| 5,515,719 | 5/1996 | Lindsay | 73/105 |

OTHER PUBLICATIONS

Binnig, et al., "Single–tube three–dimensional scanner for scanning tunneling microscopy," Rev. Sci. Instrument, vol. 57, No. 8, Aug. 1986; American Institute of Physics, pp. 1688–1689.

Drake, et al., "Imaging Crystals, Polymers and Processes in Water with the Atomic Force Microscope," Science, vol. 243, pp. 1586–1589, Mar. 1989.

Sonnenfeld, et al., "Atomic Resolution Microscopy in Water," Science, Reprint Series, vol. 232, pp. 211–213, Apr. 11, 1986.

Davidsson, et al., "A new symmetric scanning tunneling microscope design," Journal of Vacuum Science and Technology, Part A, No. 2, Mar./Apr. 1988.

Marti, et al., "Atomic force microscopy of liquid–covered surfaces: Atomic resolution image," Applied Physics Letters, vol. 51, No. 7, Aug. 17, 1987; American Institute of Physics, pp. 484–486.

Kirk, et al., "Low–temperature atomic force microscopy," Review of Scientific Instruments, vol. 59, No. 6, Jun. 1988; American Institute of Physics, pp. 833–835.

Sonnenfeld, et al., "Semiconductor topography in aqueous environments: Tunneling microscopy of chemomechanically polished (001) GaAs," Applied Physics Letters, vol. 50, Jun. 15, 1987; American Institute of Physics, pp. 1742–1744.

Martin, et al.,"Atomic Force Microscope–Force Mapping and Profiling on a sub 100–Å Scale," Journal of Applied Physics, vol. 61, No. 10, Mar. 15, 1987; American Institute of Physics, pp. 4723–4729.

Travaglini, et al., "Scanning Tunneling Microscopy on Biological Matter," Surface Science, 1987, pp. 380–390, no month.

Ohnesorge, et al., "True Atomic Resolution by Atomic Force Microscopy Through Repulsive and Attractive Forces," IBM Research Division, Science, vol. 260, Jun. 4, 1993, pp. 1451–1456.

Putman, et al., "Viscoelasticity of living cells allows high–resolution imaging by tapping mode atomic force microscopy," Department of Applied Physics, University of Twente, Netherlands. Jan. 4, 1994.

Shea, et al., "Atomic force microscopy of local compliance at solid–liquid interfaces," Chemical Physics Letters, vol. 223 (Jun. 24, 1994), pp. 336–340.

Specht, et al., Simultaneous measurement of tunneling current and force as a function of position through a lipid film on solid substrate,: Elsevier Science Publishers, B.V.; Surface Science Letters, Jul. 22, 1991.

Hansma, et al., "Atomic Force Microscope," Journal of Applied Physics, vol. 76, No. 2, American Institute of Physics, Jul. 5, 1994, pp. 796–799.

S. Jarvis, et al., "A Novel Force Microscope and Point Contact Probe", Dec., 1993, Rev. Sci. Instrum., vol. 64, No. 12, pp. 3515–3520.

A. Stewart, et al., "Use of Magnetic Forces to Control Distance in a Surface Force Apparatus", 1990, Meas. Sci. Technol., vol. 1, pp. 1301–1303. no month.

Hamers, et al., "A scanning tunneling microscopy study of the reaction of Si(001)–(2X1) with $NH_3$", J. Vac. Sci. Technol., Mar./Apr. 1988, A, vol. 6. No. 3, pp. 508–511.

Hansma, et al., "Atomic force microscopy of DNA in aqueous solutions", Nucleic Acids Research, 1993, vol. 21, No. 3, pp. 505–512 no month.

Lindsay, et al., "Scanning tunneling microscopy and atomic force microscopy studies of biomaterials at a liquid–solid interface", J. Vac. Sci. Technol., Jul./Aug. 1993, A., vol. 11, No. 4, pp. 808–815.

Lyubchenko, et al., "Atomic Force Microscopy Imaging of Double–Stranded DNA and RNA", Journal of Biomolecular Structure & Dynamics, 1992, vol. 10, Issue No. 3, pp. 589–606 no month.

Lyubchenko, et al., "Atomic force microscopy of long DNA: Imaging in air and under water", Proc. Natl. Acad. Sci., Mar. 1993, vol. 90, pp. 2137–2140.

Nagahara et al., "Preparation and characterization of STM tips for electrochemical studies", Rev. Sci. Instrum., Oct. 1989, 60(10), pp. 3128–3130.

Putman, et al., "Viscoelasticity of living cells allows high––resolution imaging by tapping mode atomic force microscopy", Department of Applied Physics, University of Twente no date.

Schueir, et al., "Creating and observing surface features with a Scanning Tunneling Microscope", SPIE, 1988, vol. 897, pp. 16–19 no month.

SCANNING PROBE MICROSCOPE FOR USE IN FLUIDS

BACKGROUND OF THE INVENTION

1. Field of the Invention

This invention relates to scanning probe microscopes used for imaging at the interface between a fluid and a solid surface, and more particularly to a versatile arrangement in which a top member houses interchangeable scanning probes for scanning tunneling microscopy (STM) or atomic force microscopy (AFM) and magnetic supports for a sample stage which hangs below the top member, being held in place by the magnetic supports. This arrangement permits the sample to be enclosed in a controlled environment, facilitating control of contamination which, in turn, facilitates electrochemical control of the interaction between the liquid and the solid surface of the probe and of the interaction between the liquid and the solid surface of the sample. The properties of the liquid layers at the probe and sample surfaces may be adjusted so that the probe can be held out of direct contact with the sample surface. A further advantage of the present invention is that the sample may be translated easily under the probe by pushing on the stage which slides against the magnetic mounts. The mounts themselves are adjustable, but do not rest on screw threads. This has the further advantage of reducing drift and creep. Yet a further advantage is that the microscope may be placed on any surface so that large samples may be scanned.

2. The Prior Art

Scanning probe microscopes are devices in which a sensing probe is moved over the surface of a sample generally in a raster pattern. A sensor detects the interaction between the probe and the surface and this signal is used to form a contour map of the surface of the sample in a computer. If the probe is very close to the surface, and interacts with the surface predominately through a single atom asperity, then the microscope can map the surface with atomic resolution. A greatly simplified illustration of the general arrangement of the scanning tunneling microscope is shown in FIG. 1 and of the atomic force microscope in FIG. 2. These illustrations are not to scale. The contact point between the probes and the sample is of atomic dimension and so is not visible by optical means. With reference to FIG. 1, the original scanning tunneling microscope (STM), which is described in U.S. Pat. No. 4,343,993, senses the electrical interaction between a conducting probe 10 and a conducting substrate 12 while a voltage 14 is applied between the tip of probe 10 and substrate 12. An image is formed by scanning the tip of probe 10 over substrate 12. Compared with prior art electron microscopes capable of lesser resolution, the STM microscope does not require electron lenses and other complex electronics, and so it can operate submerged in water, as described by Sonnenfeld and Hansma [Science, 232, 211, 1986].

The scanning tunneling microscope is limited to operation with conducting substrates. This limitation was removed by the introduction of the atomic force microscope (AFM), described in U.S. Pat. No. Re. 33,387. In one version of this device, illustrated in FIG. 2, a sensing probe 16 is attached to the end of a flexible cantilever 18, small motions of which in response to surface texture of a sample surface 20 are detected by reflection of a laser light beam 22 into a position sensitive detector 24. The sample surface 20 is scanned under the tip of sensing probe 16. The atomic force microscope can be operated in fluid also as described by Drake et al. [Science 243, 1586, 1989] but, owing to the need to push the tip of sensing probe 16 into contact with the sample surface 20, the AFM has been operated without a controlled layer of liquid between the sensing probe 16 and the sample surface 20 in the past.

Scanning tunneling microscopes for operation in an electrochemical environment have had the general arrangement shown in FIG. 3. The tip 26 is scanned by piezoelectric transducer or scanner 28. Scanner 28 is held by housing 30 above the sample 32 which is attached to the base 34. Vertical adjustment of the gap 36 between tip 26 and sample 32 is carried out with the screws 38. These screws engage bearings 40 which fix the position of the housing 30 in the horizontal plane. The liquid cell, described in various arrangements in U.S. Pat. Nos. 4,868,396, 4,969,978 and 5,155,361, all of which are hereby incorporated herein by reference, is shown schematically in FIG. 4. The tip 26 protrudes into a liquid 42 from scanner 28. Liquid 42 is held in container 44. Sample 32 is submerged in liquid 42. Electrodes 46 and 48 are placed into liquid 42 in order to effect electrochemical control of sample 32.

Prior art AFMs for operation in liquid are described in U.S. Pat. No. Re. 34,489 and are illustrated in FIGS. 5 and 6. Turning to FIG. 5, the AFM 50 includes a force sensing cantilever and probe in a liquid cell assembly 52 which are held in a glass housing in a top member 54 which also holds a light source 56 and a position sensitive detector 58. A bottom member 60 supports a scanner 62 on which the sample 64 is placed. The AFM tip is brought into contact with sample 64 by adjusting screws 66 in bottom member 60. Screws 66 engage bearings 68 which prevent motion of the top member or "head" 54 in the horizontal plane. The details of liquid cell assembly 52 are shown in greater detail in FIG. 6. Referring to FIG. 6, the liquid cell assembly 52 is fashioned from the glass housing 70 used to hold the cantilever assembly 72. The fluid is held in place by an O-ring 74 in contact with sample 64. Fluid may be injected into liquid cell assembly 52 through holes 76 in housing 70. Holes 76 may also be used for the placement of electrodes for electrochemical control of the sample.

This AFM suffers from the disadvantage that tip 78 contacts sample 64 directly. Thus, tip 78 may bond to sample 64 and the resulting adhesion may cause tip 78 to move with the sample 64 as it is scanned, degrading the resolution of the system and distorting soft sample surfaces. In order to overcome this limitation, Martin et al. [Journal of Applied Physics, 61, 4723, 1987] have developed a non-contact AFM. The general arrangement of this microscope is shown in FIG. 7. A very stiff (spring constant of about 100 N/m—a regular cantilever has a spring constant of about 0.20N/m) force sensing cantilever 80 having a probe tip 82 disposed at an end thereof is used so that attractive atomic forces will not pull it into the surface 84 when the probe tip 82 is close to the sample surface 84. In order to detect the small deflections of the tip 82 caused by relatively long-range atomic force interactions with the surface, a modulation technique is used. A modulating voltage signal 86 is applied to the scanner 88 so as to cause it to move up and down at the resonant frequency of the force sensing cantilever 80. At resonance, even small interactions with the sample surface 84 (which is not in contact with the probe tip 82) cause significant changes in the amplitude of oscillation of the probe tip 82 ($\delta z$ in FIG. 7). These changes are measured in a conventional manner such as by the optical lever method or by interferometry, both well known in the art, and are recorded by a computer as the probe tip 82 is scanned over the surface by scanner 88 and used to form an image of the surface topography of sample 84. This scheme for non-contact AFM will not work in liquids. It depends for its sensitivity upon a sharp resonant response of the cantilever 80 and this resonance would be damped by the viscosity of a surrounding fluid. It has proved possible to carry out non-contact AFM in a fluid only in one very special case. Ohnesorge and Binnig [Science 260, 1451, 1993] have operated a conventional AFM with a soft cantilever (spring constant of about 0.06N/m) in water to image a calcite surface. The surface of calcite has the rare property of interacting very weakly with a probe, so that the probe is not pulled into contact by attractive atomic forces. It proved possible to lower the probe tip so as to be very close to, but not actually touching, the surface of the calcite. In this way, atomic resolution in this special case was achieved. It is known that friction and adhesion between two surfaces can be controlled in a quite general way through control of the surface potential of each surface. This phenomenon is reviewed by Guruswamy and Bockris in Comprehensive Treatise of Electrochemistry, 1977. In the present invention, this phenomenon is applied to control surface forces so that non-contact AFM can be carried out in fluids on other surfaces in addition to calcite.

The prior art described above also suffers many other important limitations: First, the sample arrangements for STM and AFM are different so that STM and AFM require different sample preparations (see, e.g., FIG. 4 and FIG. 6). Second, the screws used for adjusting the gap between the probe and the sample cause drift and creep because of the flow of lubricants in the screw thread. Third, the sample cells are difficult to place in the microscope and electrodes and tubes for fluid flow are difficult to connect. Connection of electrodes and tubes to the cell can result in drift because of stresses that are placed on the sample cell when these components are connected. Fourth, the O-ring seal 74 has proven ineffective in many cases, resulting in leaks. Fifth, the sample size in all the arrangements described above is limited by the length of screws and placement of the screws. Sixth, the prior art designs do not permit hermetic sealing of the sample chamber. In the STM shown in FIG. 3 vapors from the sample can damage high voltage components in the scanner. In the AFM shown in FIG. 5, vapors from the sample can damage the light source and detectors. Furthermore, hermetic sealing of the top member would make alignment very difficult. Seventh, the AFM sample cell shown in FIG. 6 has a very small volume and the tip cannot be handled independently of the cell. Eighth, it is difficult to translate the samples over large distances. The top members are fixed to the bottom members by the bearings which hold the end of the vertical adjustment screws, so the head cannot be translated relative to the sample without the introduction of an additional translation stage. Ninth, the prior art does not facilitate operation of the STM at low set-point currents because of stray signals that arise from the placement of the tip on the scanning tube.

OBJECTS AND ADVANTAGES OF THE INVENTION

Accordingly, it is an object of the present invention to provide a scanning probe microscope system which is easy to use in a typical laboratory setting.

It is another object of the present invention to provide a scanning probe microscope system which utilizes the same sample stage for both STM and AFM microscopy.

It is another object of the present invention to provide a scanning probe microscope system in which the sample can be translated over relatively large distances (such as about 4 mm×4 mm) without the use of an additional translation stage and without introducing drift into the microscope as a consequence of large translations.

It is another object of the present invention to provide a scanning probe microscope system which has a superior stability and ultra low drift in all directions during its normal operation.

It is yet another object of the present invention to provide a scanning probe microscope system in which the force probe is operated in non-contact mode with a force sensor above a sample surface in liquid.

It is a further object of the present invention to provide a scanning probe microscope system in which the sample platform is easily removed and attached, has a stable leak-free liquid cell, a method for introducing liquids into the cell that does not strain the cell, a method for introducing electrodes into the cell that does not strain the cell, has creep-free, adjustable-force clamps which hold the cell in place, can operate with a wide range of sample and cell sizes and permits interchange of fluid during atomic resolution scanning.

It is a further object of the present invention to provide a scanning probe microscope system in which the sample platform is housed inside a hermetically sealed and environmentally controlled chamber.

It is a further object of the present invention to provide a scanning probe microscope system in which the chamber has inlets/outlets to permit exchanging various type of gases for environmental control.

It is a further object of the present invention to provide a scanning probe microscope system in which the force probe may be operated under electrochemical potential control in liquid.

It is a further object of the present invention to provide a scanning probe microscope system in which the scanning head assembly is interchangeable between STM and AFM microscopy modes scanning without unloading the sample.

It is a further object of the present invention to provide a scanning probe microscope system in which the scanner is equipped with tubing allowing fluid to be introduced into the cell.

It is a further object of the present invention to provide a scanning tunneling microscope system in which the tunneling probe is capable of operating at currents of a picoampere or less in conducting liquids.

Yet another object to provide a microscope that may be placed onto any surface in order to scan it.

It is still another object to control contamination of the sample being scanned by the use of a protective fluid.

These and many other objects and advantages of the present invention will become apparent to those of ordinary skill in the art from a consideration of the drawings and ensuing description of the invention.

SUMMARY OF THE INVENTION

The foregoing objects have been achieved in the scanning probe microscope of the present invention which is easily set up with a liquid cell and experiences ultra-low drift and provides a superior environment for more controlled imaging. It comprises a microscope frame including a body block having a bore near its center, adjustable supporting mounts and at least two adjustment pegs extending downwards, a sample platform suspended magnetically by the supporting mounts, a fluid cell held with adjustable force clamps, the STM and/or AFM scanning head assemblies passing through the bore (and locked into place in the body block), the tip or force sensor being lowered into the liquid cell from above with a hermetically sealed chamber attaching to the body block from below so as to enclose the sample platform.

According to one aspect of the invention, the body block holds the scanning head in a cylinder which may be rotated about its axis to aid alignment of the AFM optics. It also has a micrometer-driven sliding block placed on its top, which sliding block may contain a position detector or an alignment tool for the AFM optics.

According to a second aspect of the invention, the adjustable supporting mounts comprise two cylindrical plungers (placed in front of the block and close to the scanning probe) and one motor-driven fine adjustment screw (placed on the back of the block and further from the scanning probe). The fine screw, driven by a stepper motor, is threaded through the body block, the two plungers slide tightly through the body block. Each plunger has magnetized balls placed at the low end and a key slot located in the middle to prevent it from rotating, the slot also being used for locking the plunger in position after adjustment. The upper part of each plunger is threaded, and held in a threaded nut. The nuts are held on the body block but are free to rotate, and they provide an adjustable vertical movement of the plunger.

According to a third aspect of the invention, the two adjustment pegs on the body block, driven by fine adjustable screws, move perpendicularly with respect to one another in the horizontal (x,y) plane. The lower part of each peg has a sensor which will signal when it is in contact with the sample platform. The pegs engage into slots in the platform in order to effect translation in the horizontal plane. Electrical contact between the pegs and the sample platform is used to monitor contact, so that the pegs may be pulled out of contact once the sample platform is moved into the desired position by the pegs.

According to a fourth aspect of the invention, the top surface of the sample platform is polished so that the platform moves smoothly on the magnetic balls. The sample platform is made from a magnetic material so that it is gripped by the balls. An insulating block is placed on the sample platform. The block has spring clamps for connecting electrodes. The sample platform has two slots which engage the adjustment pegs. The slots are made somewhat oversized, so that the pegs may be withdrawn from contact and are arranged with their long axes mutually perpendicular so that the pegs achieve orthogonal translations of the sample platform in the horizontal plane.

According to a fifth aspect of the invention, a fluid cell is attached to the sample platform with adjustable clamps. These may be magnets mounted on screws, arranged so that the force with which the cell is held over the sample is adequate to prevent leaks of the fluid, but small enough so that creep does not occur because of stresses in the sample. The cell is easily placed over the sample with no need of separate clamps or screws.

According to a sixth aspect of the invention, the scanning head assembly is easily changed between STM and AFM, utilizing the same body block and sample platform for both techniques. The solution is introduced into (and passed through) the fluid cell via tubes which enter the fluid cell from the scanning head. The tubes are thus automatically aligned and yet not in need of physical attachment to the fluid cell, save through the body of fluid. In the preferred embodiment, the sample platform is completely enclosed by a chamber, with inlet and outlet connections, so that the experimenter may fill the sample area with various gasses and exchange them as desired. The scanning probes enter the chamber through flexible seals so that the scanner is isolated from the sample chamber.

According to a seventh aspect of the invention, electrochemical control of the potential of either or both of the sample and the force sensing probe is used so as to control interactions between the probe and the sample surface. This permits general operation of the atomic force microscope in the non-contact mode in fluids.

According to an eighth aspect of the invention, contamination of the surface being studied may be controlled by placing the scanning probe and the surface under a protective fluid. This results in quantitative control of contamination in four ways. Firstly, for a given amount of contamination present in the protective fluid, the slow motion of the contamination towards the surface by translational diffusion gives time for the surface to be studied while it is still relatively clean. For example, if the solution contains a concentration c (molar) of an unwanted molecule, then the time for $1 \times 10^{14}$ molecules to accumulate onto one square centimeter of the surface by the process of translational diffusion from the bulk is given approximately by $1 \times 10^{-12}/36\ c^2 D$ seconds, where D is the translational diffusion constant of the unwanted molecule in the fluid. For $D \approx 1 \times 10^{-6}$ cm$^2$/sec (typical) and c=one micromolar, then the surface will take $10^6$ seconds to become contaminated by $10^{14}$ molecules per cm$^2$ and this time may be used to study the surface in a relatively clean condition. Secondly, if the depth of the fluid is such that the number of molecules is insufficient to form a monolayer, then the surface can be protected indefinitely. Thirdly, if the surface, as prepared, is covered by molecules that are soluble in the fluid, the surface will be cleaned by being placed under the fluid. Fourthly, the use of a fluid containing ions permits the potential of a conducting surface to be controlled and, by adjusting the surface to an appropriate potential, contamination may be repelled from the surface. For example, if the contamination consists of negative ions, then making the surface negatively charged can repel such ions. The fluid may be water or any organic solvent in which ions may be dissolved or which is a solvent for other contaminants such as hydrocarbons. Examples of useful fluids are the alcohols, methanol, ethanol, propanol and butanol. Solvents like chloroform, carbon tetrachloride, methylamine, acetone, benzene and paraffin oils are useful in dissolving organic contamination from the surface.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 1:
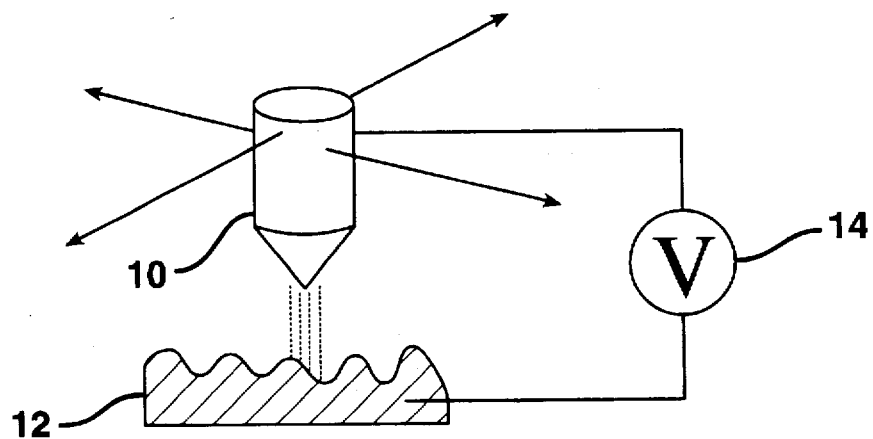
FIG. 1 is a simplified schematic drawing of a scanning tunneling microscope according to the prior art showing the scanning of a conducting tip over a conducting surface.
Figure 2:
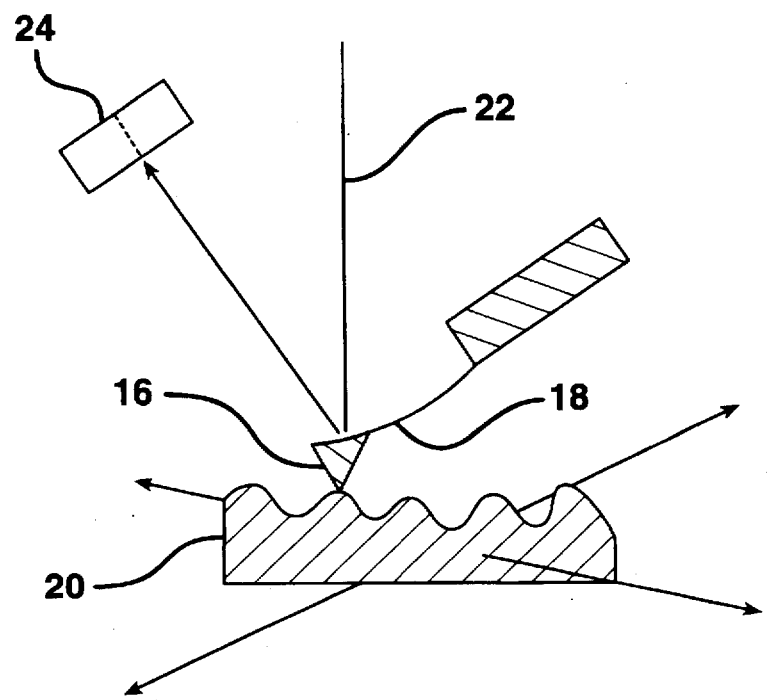
FIG. 2 is a simplified schematic drawing of an atomic force microscope according to the prior art showing how a sample is scanned by a force sensing probe which is placed in contact with the sample.
Figure 3:
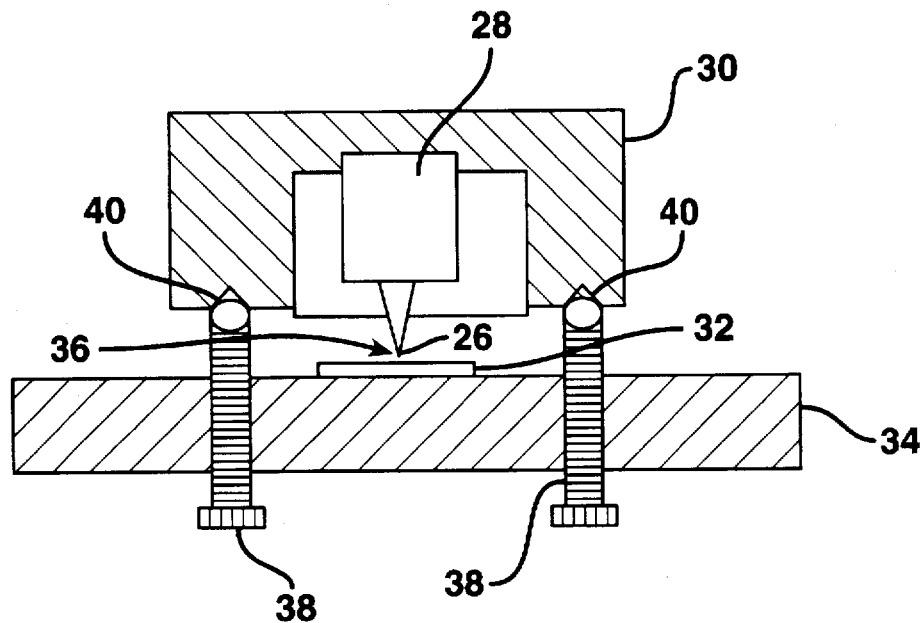
FIG. 3 shows the mechanical layout of a typical STM according to the prior art wherein the scanning head cannot be translated in the horizontal plane.
Figure 4:
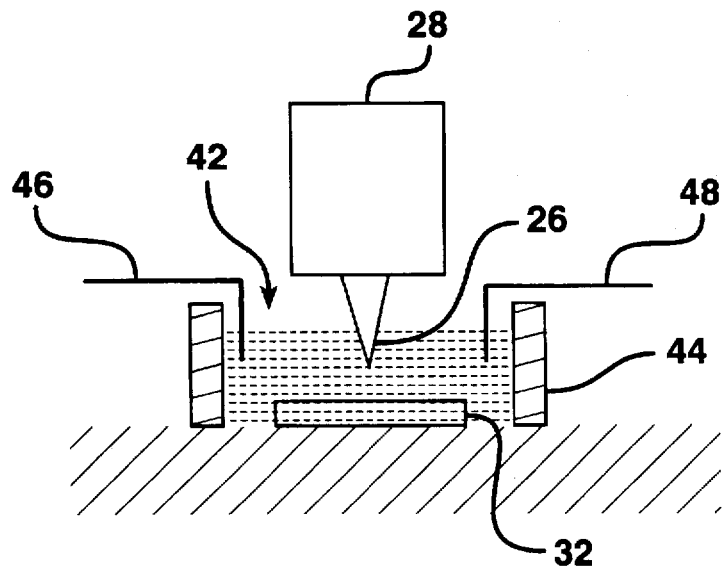
FIG. 4 shows a liquid cell for STM according to the prior art.
Figure 5:
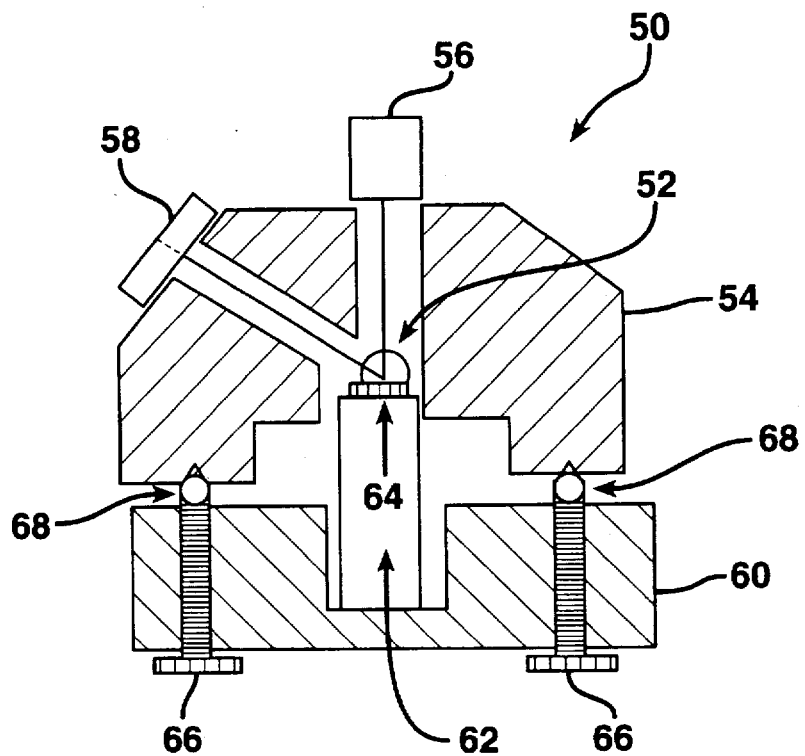
FIG. 5 shows an AFM according to the prior art for operation in fluids and illustrating how the base is not easily translated with respect to the scanner or the probe.
Figure 6:
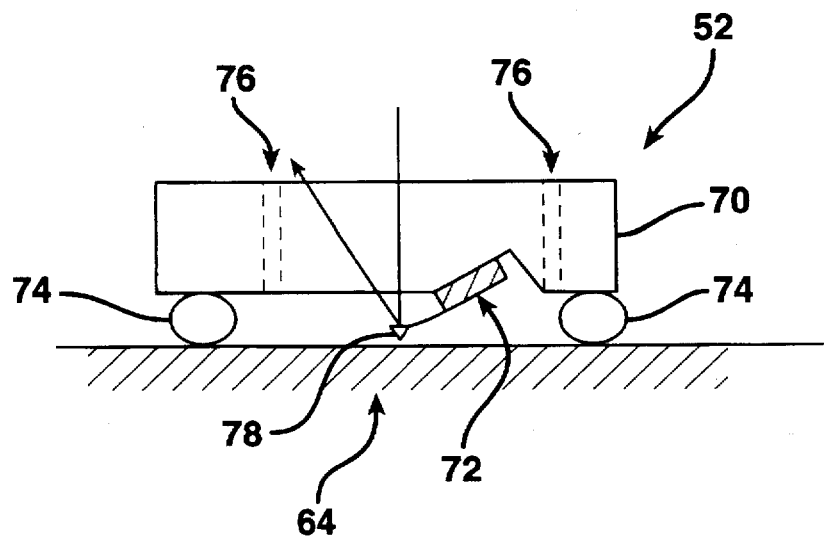
FIG. 6 is a detailed diagram showing the liquid cell for AFM according to FIG. 5.
Figure 7:
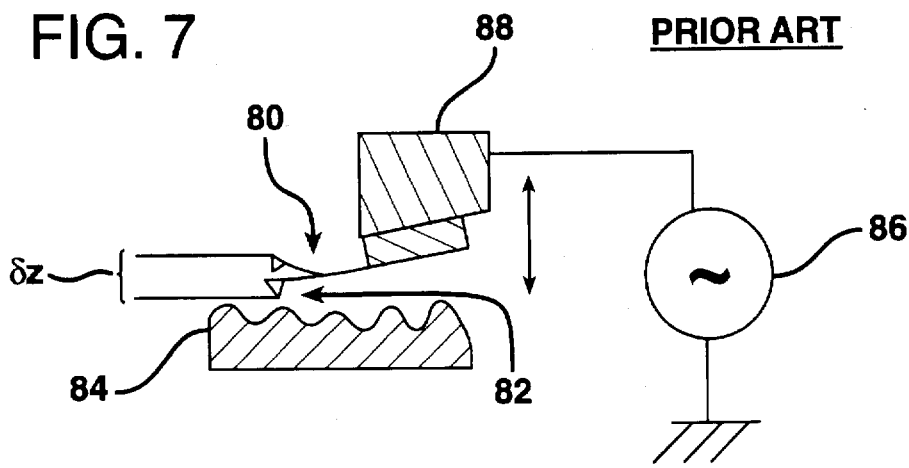
FIG. 7 is a simplified schematic diagram of a scheme for non-contact AFM in air or vacuum according to the prior art.
Figure 8:
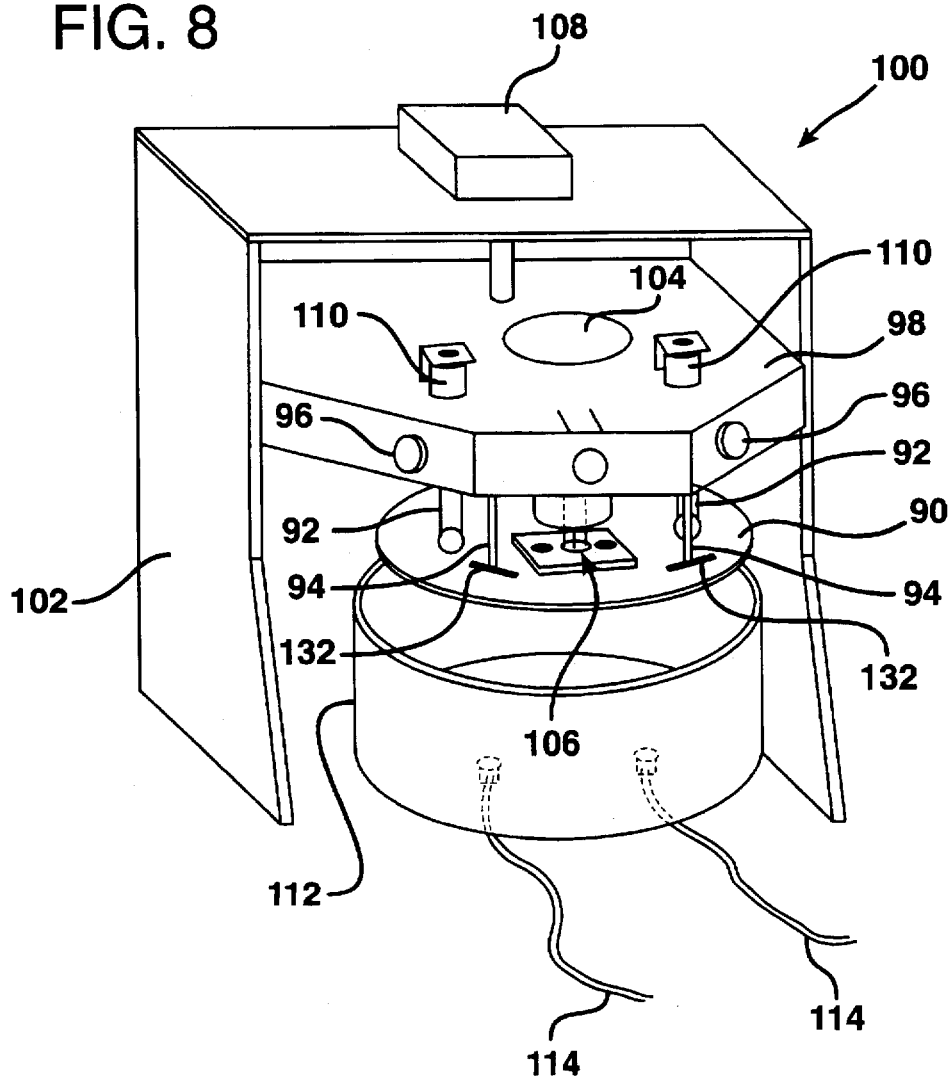
FIG. 8 is a perspective illustration of the scanning probe microscope system according to the present invention.
Figure 13:
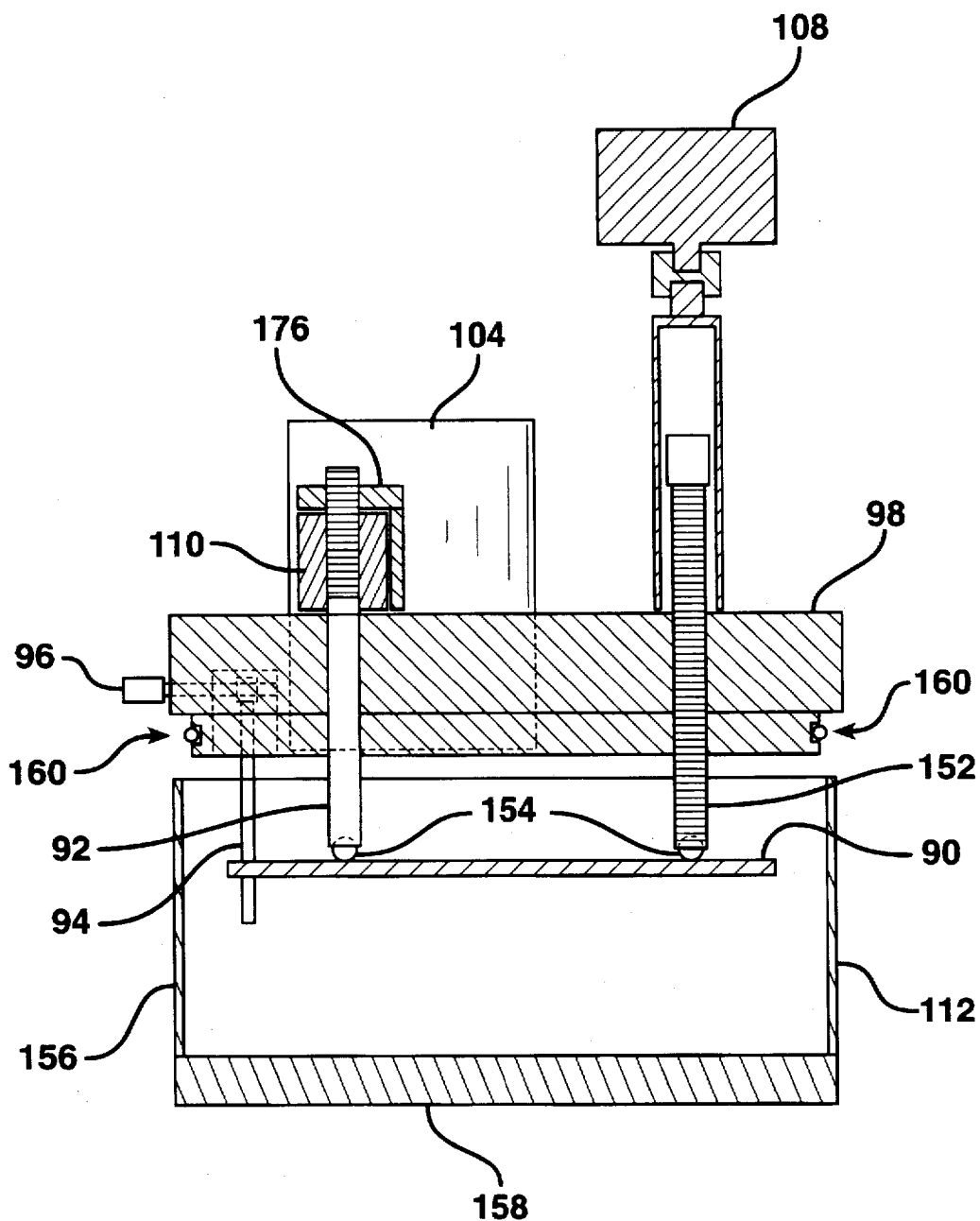
FIG. 13 is a partially cutaway right side view of the body block of the microscope according to the present invention.
Figure 26:
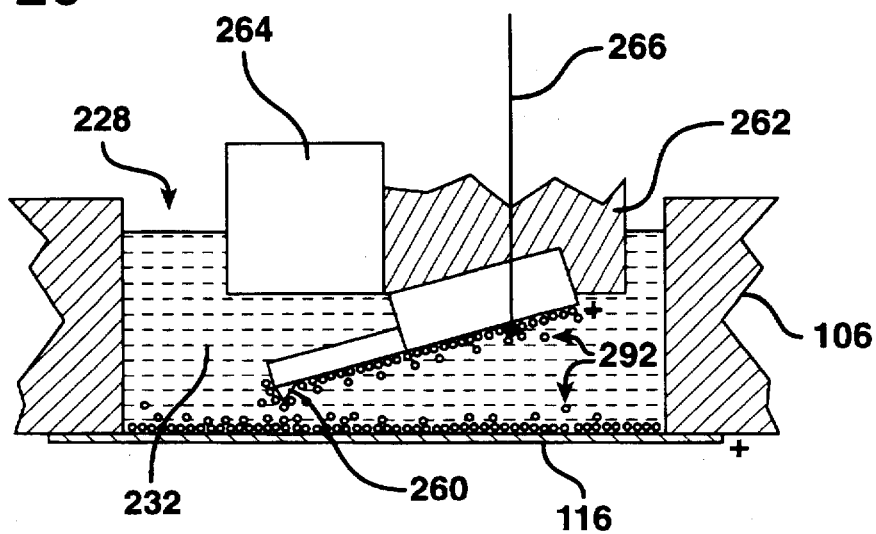
FIG. 26 is a detail of the holder and light-transmission optic for the force sensing probe according to the present invention. It also shows a greatly simplified version of the controlled ion distributions achieved by potential control of the probe and the sample.

According to a presently preferred embodiment of the present invention, the essential elements of the system are depicted in the perspective view of FIG. 8. The same sample platform 90 is advantageously used for either STM or AFM. It is suspended magnetically on three supporting mounts 92 that give low drift in horizontal and vertical directions and it permits translation in the horizontal (x,y) plane using preferably two adjustment pegs 94. Pegs 94 are adjusted with micrometer screws 96 mounted in the main body or "body block" 98 of the microscope 100. Main body 98 may be considered part of frame 102 discussed below because it is rigidly mounted to it. The scanning head 104, which may be either an STM or AFM, is lowered into the liquid sample cell 106 from above, and fluid is introduced through the scanning head 104. The fine-approach motor 108 is mounted above the head 104 on a frame 102 which may support the whole microscope. The motor 108 drives the fine-approach mount (not shown in FIG. 8, but see reference numeral 152 in FIG. 13). The other two supporting mounts or "plungers" 92 are manually adjusted with rotating threads 110 on top of the microscope body. A glass cover 112 may be placed over the sample area to form a hermetically sealed chamber. It is held in place by an O-ring 160 (in FIG. 13) on the underside of the main body 98. The cover is held in place by compression of O-ring seal 160 by cover 112 as illustrated in FIG. 13. Gasses or vapors may be introduced into the chamber by tubes 114. For example, the chamber formed by cover 112 may be flushed with an inert gas such as argon or nitrogen or the like to prevent contamination of the sample during operation of the scanner. For AFM, potential control of a conducting force-sensing probe can be used to operate the microscope in the non-contact mode in the fluid. This is illustrated in FIG. 26. Unlike prior art for the AFM, which used a cover to hold liquid over a scanned sample stage, this microscope uses a cell, which is an improved version of the cell design by S. M. Lindsay for STM (U.S. Pat. No. 4,868,396) and STM and AFM (U.S. Pat. No. 5,155,361). The cell is quickly loaded onto the microscope body which may house an AFM scanning head, an STM scanning head, or a head which combines both techniques. Fluid is loaded or changed via the scanner, forming a self-aligned liquid body that includes the scanner.

Figure 9:
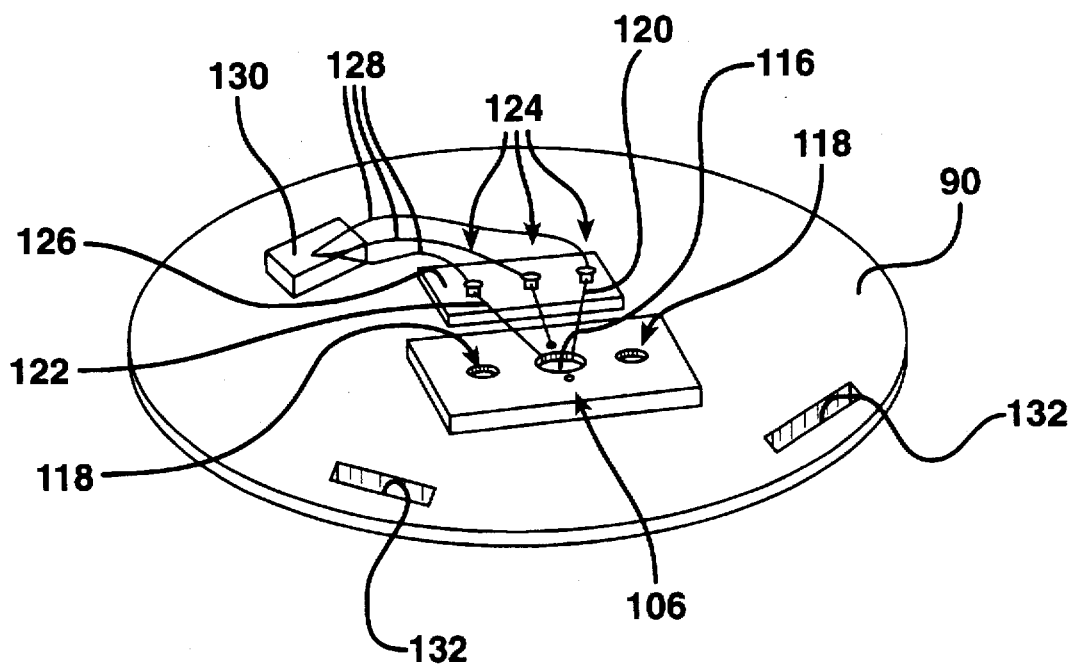
FIG. 9 is a perspective drawing of the sample platform on which the fluid cell sits according to the present invention.
Figure 10:
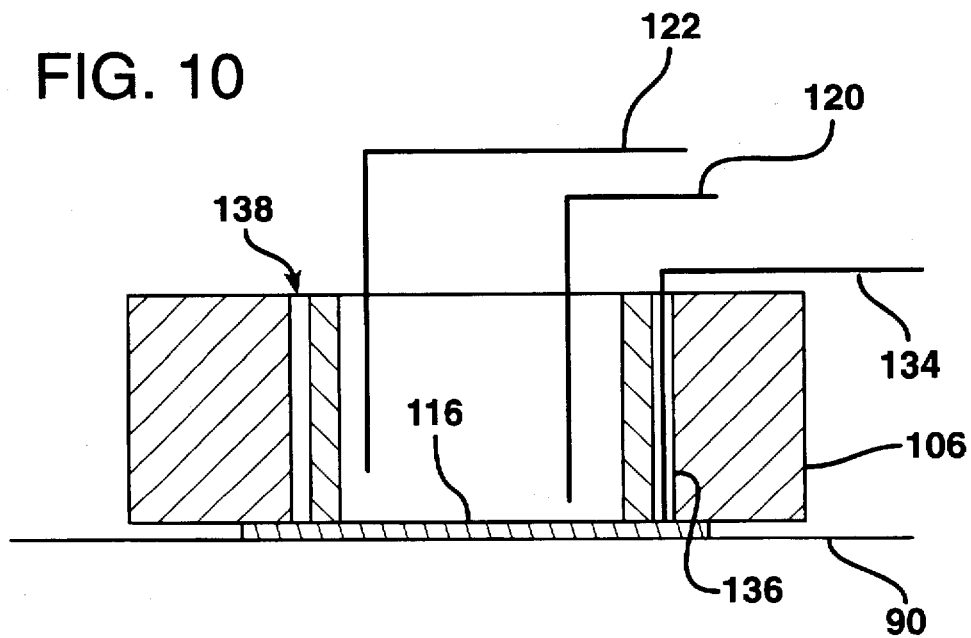
FIG. 10 is a cutaway side view of a fluid cell according to the present invention.
Figure 11:
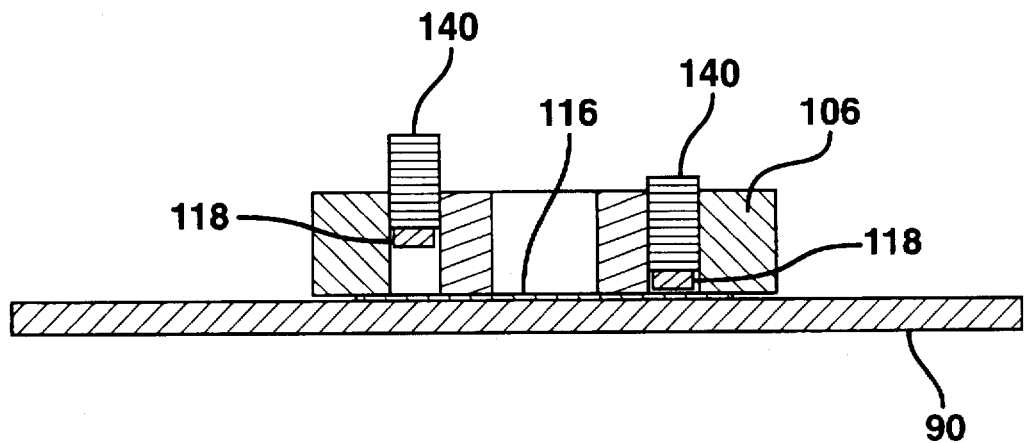
FIG. 11 is a partially cutaway side view of a fluid cell, showing adjustable-force clamps according to the present invention.

The sample platform is depicted in detail in FIG. 9. It includes a polished, magnetic stainless steel (stainless steel to which magnets are attracted) sample platform 90 on which the sample substrate 116 and liquid sample cell 106 sit. The fluid cell may be made from a plastic or glass material which is easy to clean and forms a good seal onto the sample. The cell is held on the substrate using magnets 118 which pull the cell down onto the sample. Electrodes 120, 122 dip into cell 106 so as to contact the fluid, but not the cell. The electrodes 120, 122 are held in spring loaded clamps 124 in an insulating block 126, where they are connected to leads 128 and thus to a connector 130 where flexible wires (not shown in FIG. 9) which permit easy translation of the sample platform, exit the sample chamber via a hermetically sealed electrical connector (not shown) and are thence connected to the electronics (not shown) used to maintain potential control. Slots 132 in platform 90 accommodate adjustment pegs 94 used to adjust the horizontal x-y position of platform 90. Referring to FIG. 10, the electrodes 120 and 122 hang into the fluid cell 106. The sample substrate (or working electrode) 116 is contacted by a stiff wire 134 that is pushed into a hole 136 in the fluid cell assembly 106. Contact is verified by placing a test electrode into an additional hole 138 which also communicates with the sample substrate 116, and checking for continuity with the electrode 134. Referring to FIG. 11, the cell 106 is pushed against the sample substrate 116 so as to hold it in place on the sample platform 90 by the attractive force between magnets 118 and the sample platform 90 which is fabricated from a material such as magnetic stainless steel. The magnets 118 rest in the sample cell 106 on the end of magnet adjustment screws 140 which permit adjustment of the distance between the magnets 118 and the sample platform 90. Thus, the force on the sample 116 may be set at an optimum level to minimize drift.

Figure 12:
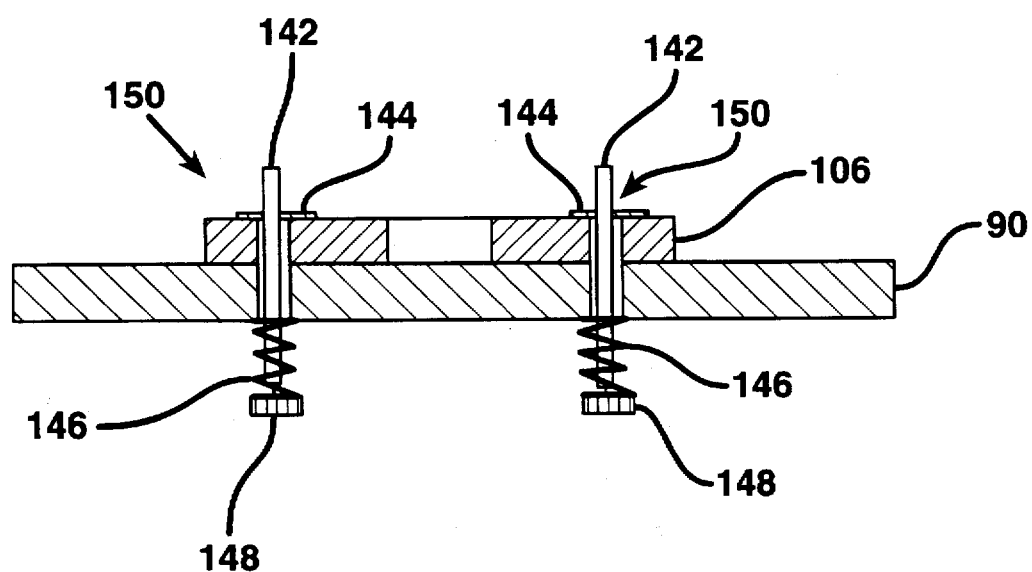
FIG. 12 is a diagram showing another embodiment of the sample cell clamps using adjustable spring-loaded clamps.

Another embodiment of the sample cell mounting is shown in FIG. 12. The sample cell 106 is held onto the sample platform 90 by rods 142 which pull onto the surface of sample cell 106 by means of pins 144. The retaining force is obtained by compression of springs 146 which are compressed by screws 148 which are threaded into rods 142. Rapid assembly is possible because the cell is mounted on rods 142 with the pins 144 removed. The rods 142 are then pushed up from below so that the holes 150 for locating the pins 144 appear above sample cell 106. The pins 144 are pushed into place and the rods 142 allowed to fall back to a preset position. Other similar mechanisms are also possible as would be known to those of ordinary skill in the art.

This general arrangement of the sample platform makes the operation of changing samples extremely easy. Furthermore, alignment of the STM and AFM is greatly facilitated because a "dummy" or substitute sample platform may be clipped into place on the magnetic mounts prior to loading of the actual sample. In this way, the height of the tip or force-sensing probe may be adjusted in advance so that no coarse adjustment of the gap between the sample and the probe is needed when the alignment platform is exchanged for the actual sample platform.

Figure 14:
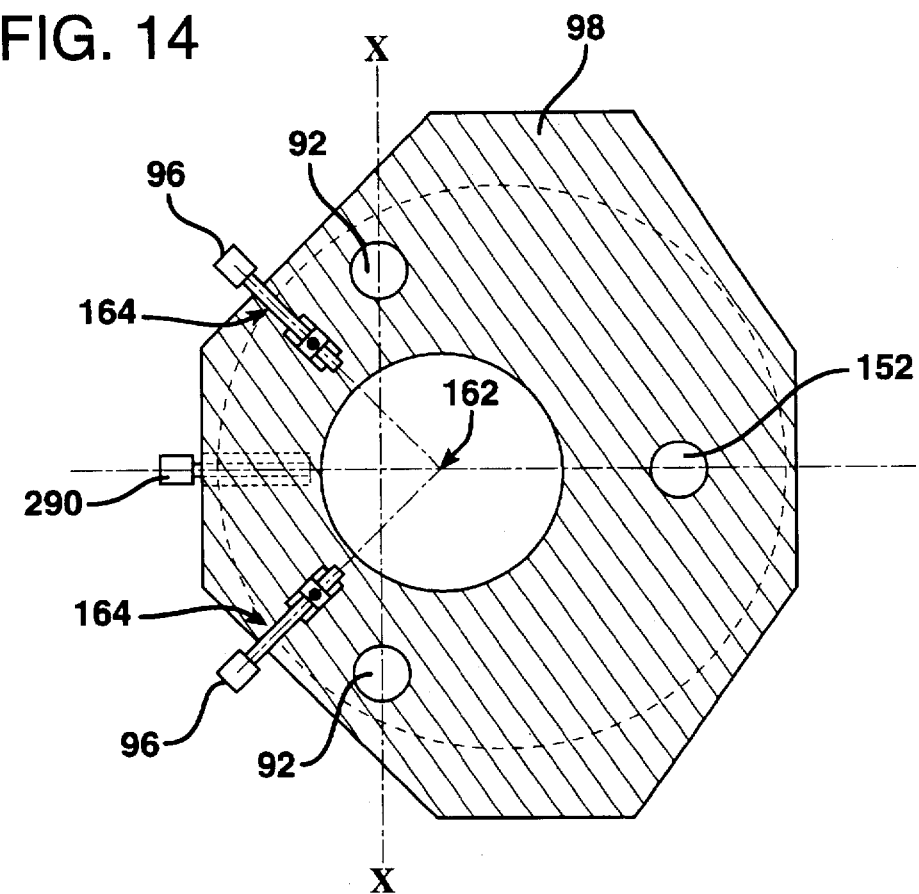
FIG. 14 is a top view of the body block showing the orthogonal travel of the adjustment pegs according to the present invention.
Figure 15:
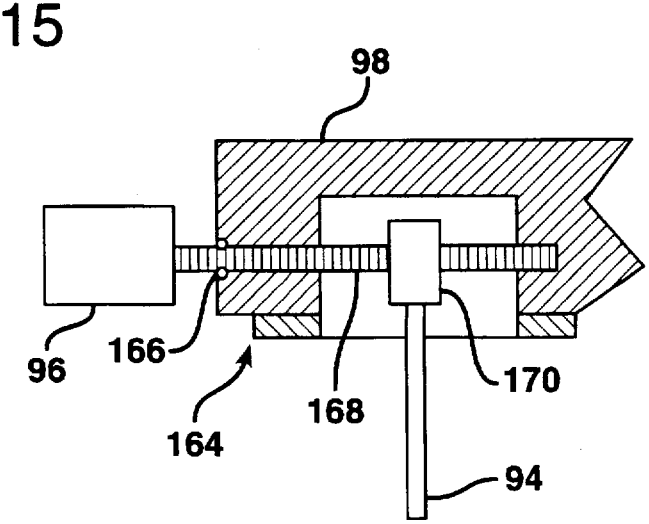
FIG. 15 is an enlarged detail of the body block of the microscope according to the present invention, showing how the peg rides on the micrometer adjustment.

Unlike the prior art which relies on screw adjusters located into kinematic (groove, cone and plane) bearings for vertical alignment, in this invention, the adjustment of the gap is achieved with plungers that eliminate drift inherent in screws. Referring to FIG. 13, plungers 92 are used only to replace the coarse approach screws of the prior art: drift in the fine approach screw 152 attached to motor 108 is not as important because it is positioned so that motion of this approach screw 152 is reduced by the lever reduction factor which is used to obtain fine approach in the first place. Furthermore, since the sample platform 90 is a smooth plane supported by a magnetic means comprising three magnetic balls 154, x-y translation of the sample platform 90 is straightforward and drift-free. Those of ordinary skill in the art will easily recognize that a number of magnetic means would work as well, e.g., steel balls backed to permanent magnets, magnetized steel or iron or nickel balls, ball-shaped permanent magnets, magnets with partially rounded ends for contacting the smooth surface of the sample stage, and the like. A ball shape is not required, only convenient. It is preferred to have the portion of the magnetic means which contacts the upper surface of the sample platform 90 to have some sort of rounded surface to minimize contact area thus reducing sliding friction. An enclosure 112, which in the preferred embodiment, consists of a glass tube 156 sealed at the bottom by a plate 158 is placed over the sample area by being pushed up onto an O-ring seal 160 so as to form a hermetic seal. A top view of the placement of the plungers 92 and fine adjustment screw 152 is shown in FIG. 14. The plungers 92 lie on the line "X—X" which passes close to the point 162 where the tip (not shown in FIG. 14) descends. The fine adjustment screw 152 is set back some distance from this line, so that its vertical motion is reduced at the probe by the ratio of the distance between the probe tip at point 162 and the line "X—X" and the probe tip at point 162 and the fine adjustment screw 152. Also shown is the placement of the micrometer adjustments 96 used for translating the pegs 94. A detail cut away view of the connection between these micrometers 164 and the pegs 94 is shown in FIG. 15. The micrometers 164 are held in place by a clip 166 but are otherwise free to rotate in the body block 98. The clip 166 also serves to form a hermetic seal of the micrometer screw 168 into the body block 98. The peg 94 rides on a threaded block 170. It is located into the sample platform 90 as shown in FIG. 13. In order to isolate the sample platform 90 from drift and creep in these micrometer screws 168, the peg 94 fits into a slot 132 (previously depicted in FIGS. 8 and 9) in the sample platform 90 that is somewhat larger that the peg 94. A lamp (not shown) or other electrical indicator circuit as well known in the art may be used to indicate electrical contact (and hence, physical contact) between the peg 94 and the sample platform 90 as these elements form a switch which is "on" when they are in contact and "off" when they are not. The horizontal position of the platform 90 is adjusted with the pegs 94 which are then retracted so that they are out of contact with the sample platform 90 (as indicated by the lamp or other indicating circuit). In this way, drift and creep of the micrometer threads 168 is not communicated to the sample platform 90.

Figure 16:
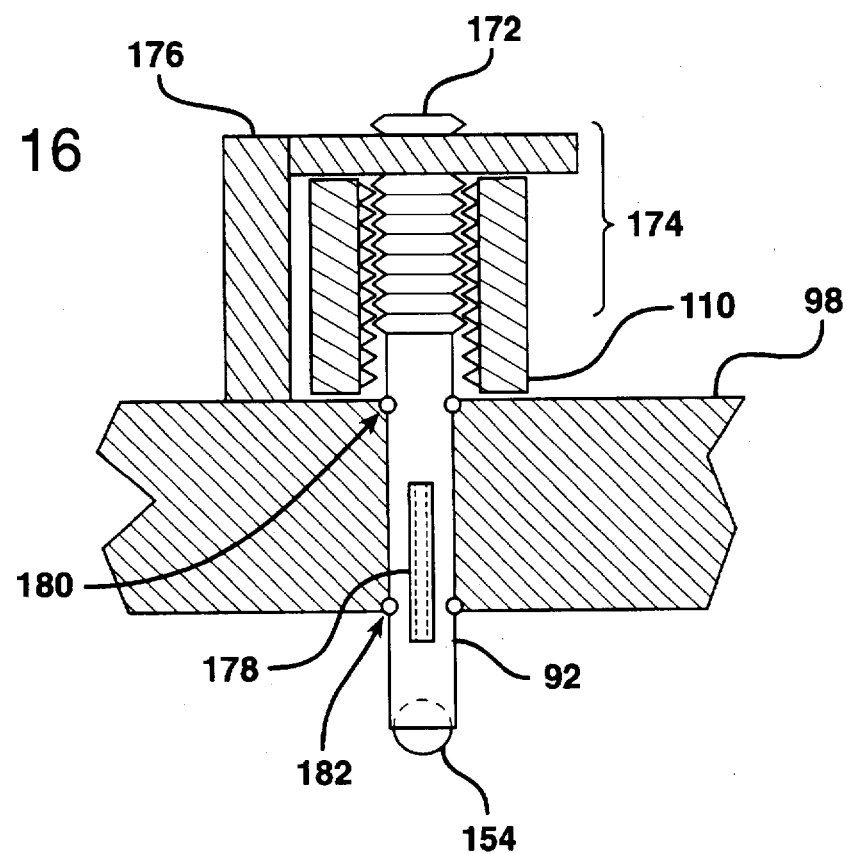
FIG. 16 is a partially cutaway front side view of the body block showing a detail of the vertical adjustment pegs according to the present invention.

In the preferred embodiment, the scanning assembly, being either an STM or AFM, is contained in a bore in the body block with the probe penetrating below the body block through a flexible seal which permits it to be scanned but seals the scanning assembly from the sample chamber. This arrangement also permits more complex scanners to be put in place easily. Thus, the scanner may be a unit that includes both a force sensing probe and a tunneling tip so that STM and AFM can be carried out on the same sample. The general placement of the scanner is shown in FIG. 13 where a side view illustrates the scanner 104 located in the body block 98. The scanner 104 is located so that the probe is placed in the horizontal plane as shown by the top view in FIG. 14. Here, the probe is placed at a site 162 which gives coarse adjustment of its height with the plungers (adjustable rods) 92 and fine adjustment with the motor driven screw 152. Drift in the screw thread of the motor driven screw is not important because the vertical motion of this screw is reduced at the probe 162. A typical reduction factor lies in the range of ten times to fifty times. The motion of the plungers 92 is hardly reduced at all, so it is essential that drift and creep is eliminated from their motion. The arrangement of the plungers is shown in FIG. 16. They consist of a rod 172 that is threaded on its upper part 174 and which is held in a threaded nut 110 which is free to rotate but not to move vertically, being kept in place by the bracket 176. Axial rotation of the plunger 92 is prevented by a pin which rides in a slot 178 in a region of the rod 172 that is not threaded.

This region is a smooth cylinder forming a tight sliding fit into the body block 98. It is further sealed by O-rings 180, 182. Thus, as the nut 110 is turned, the plunger 92 moves up and down accordingly.

Figure 17:
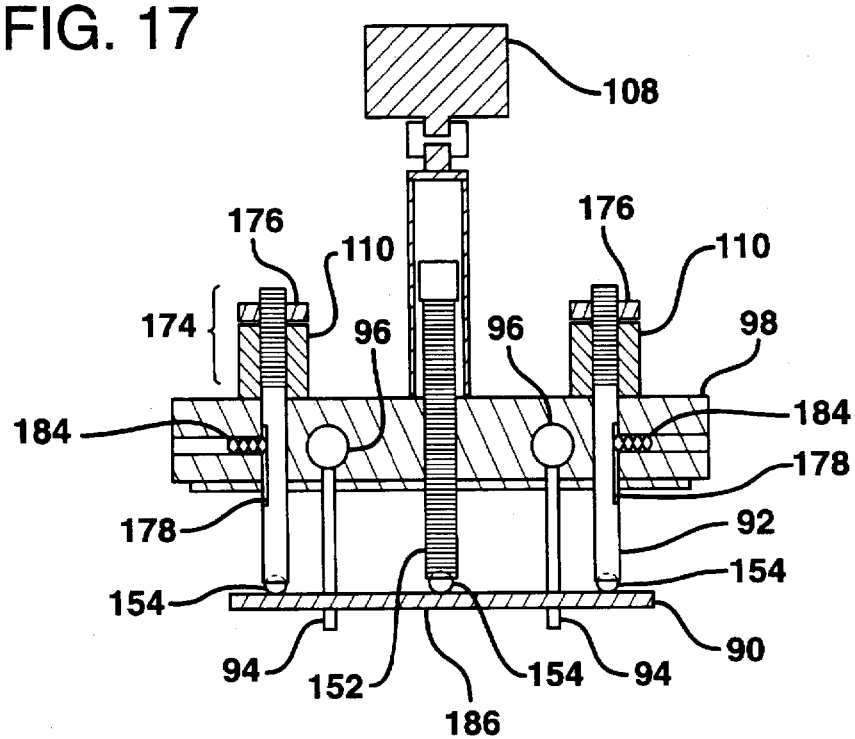
FIG. 17 shows the plunger locking mechanism according to the present invention.

A side view of the arrangement of the plungers 92 is given in FIG. 17. The plunger 92 is locked into place after adjustment by the pin 184 which is formed on the end of a screw as shown. Plunger 92 is preferably partially threaded at its first or top end 174 and smooth at its bottom or second end. In this way, the smooth cylindrical part of the plunger is locked into place once the height of the plunger has been adjusted. Typically, adjustment would be carried out with a "dummy" or substitute sample platform 90 in place of the actual sample. The probe would be adjusted to the correct height using the plungers 92 and nuts 110 using an optical microscope to view the gap. This operation can be carried out in any environment that is suitable. Thus, when the sample platform 90 holding the real sample is snapped into place, it is automatically aligned. This increases the ease with which samples may be interchanged and permits samples to be handled in an environment that is not conducive to careful alignment of the microscope (such as a laminar flow hood or gas bag).

FIG. 17 further shows a side view of the mounting of the sample platform 90. The top surface 186 of the platform 90 is polished and attaches to the upper body by a three-point mount formed from the contact of the magnetized balls 154 at the end of the fine adjustment screw 152 and the plungers 154. Thus, the platform may be slid anywhere in the horizontal plane so long as all three balls 154 contact the top surface 186 of the platform 90. This translation is achieved with the adjustable pegs 94 as described above.

In the prior art for atomic force microscopes, as described in U.S. Pat. No. Re. 34,489, a conducting screen between the scanner and sample has had to be relied upon in the past in order to eliminate electric field effects from the high voltage scanner. However, such screens are usually metal and not easy to seal when scanned. It is difficult to form a hermetic seal between the scanner and the sample chamber. Furthermore, such a conducting screen is not required when the probe is submerged in a conducting fluid where surface charging may be controlled electrochemically.

In other prior art devices, liquid for addition to the cell has been fed through holes in the side of the cell. This is undesirable because strains in the fluid lines cause drift. These problems are eliminated in the present invention. Here, the fluid is injected essentially via the scanner itself, the fluid system being connected to the scanner directly. A flexible seal is used between the scanner and the sample chamber. In one embodiment, this seal is made from silicone rubber. In this way, the probe can be fully immersed in the cell and the fluid inlet and outlet lines accurately positioned in the cell simultaneously with the force-sensing probe and the scanner is protected from liquid vapors associated with the sample.

Figure 18:
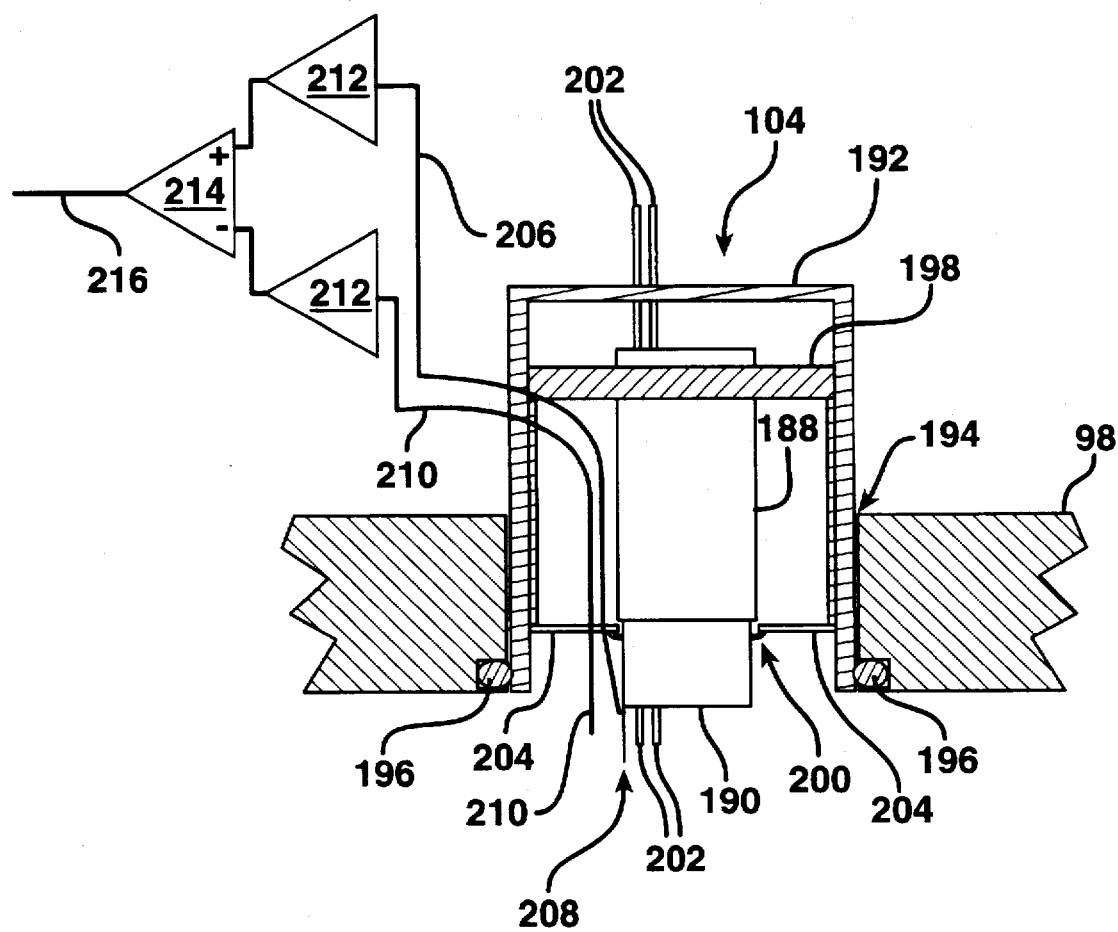
FIG. 18 is a cutaway side view of the STM head assembly according to the present invention.

The preferred embodiment for STM is illustrated in FIGS. 18–21. Referring to FIG. 18, the scanner tube 188 and scan extender 190 (an insulating block or other element formed from an electrically insulating material) form the STM scanner which is located in a cylindrical housing 192. The housing 192 is placed in a bore 194 in the body block 98. The bore 194 is sealed by an O-ring 196 which bears against housing 192 of the scanner 104. The scanner tube 188 is held in the housing 192 on an insulating ring 198 at its top end. Its bottom end is sealed to the housing by a flexible rubber seal 200. The fluid lines 202 pass through the scanner 104 and are described in more detail below. The scanner housing 192 is locked into place in the microscope body 98 with a set screw (not shown). It is easily removed so that it can be replaced with the AFM scanner which preferably has the same diameter as the STM scanner.

Figure 19:
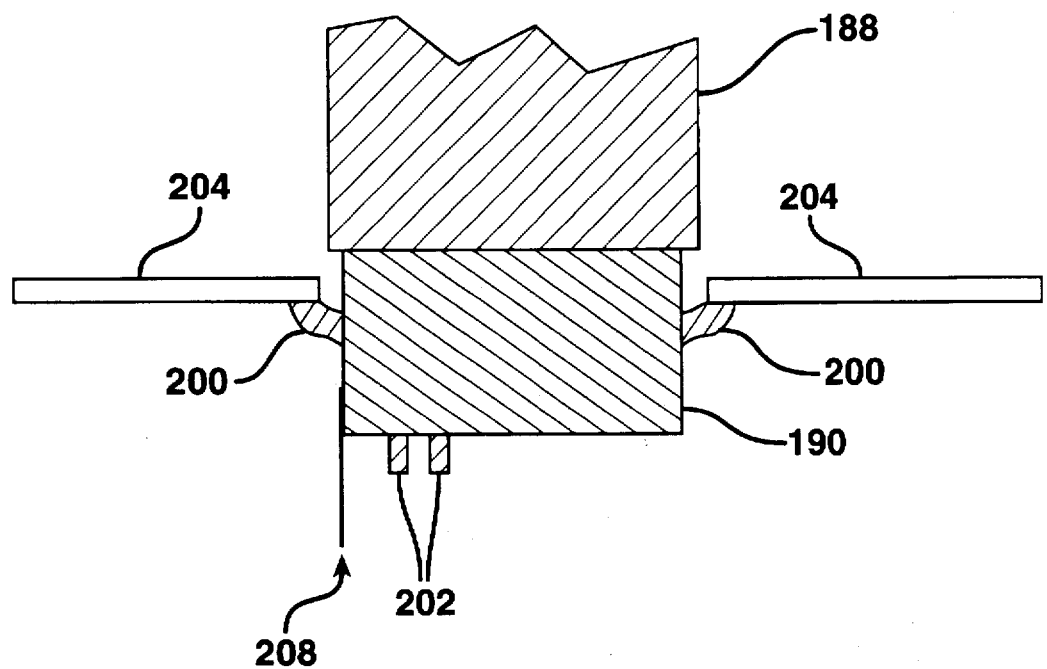
FIG. 19 is a diagram showing the flexible rubber seal around the scanner.

Further details of the flexible rubber seal are shown in FIG. 19. The scan extender 190 is sealed against a surrounding disk 204 by a flexible rubber seal 200. The assembly forms a hermetic seal that isolates the sample chamber from the scanner element 104. The seal is flexible enough so that interference with the scanning process is avoided.

In one embodiment as shown in FIG. 18, the signal wire 206 which runs to the STM tip 208 is accompanied by an additional wire 210 which is used to sense noise and undesired leakage suffered by the signal wire 208. Each wire 206 and 210 thus picks up the exact same noise, however, wire 208 also contains the signal from the probe. Each wire is connected to an identical current to voltage converter 212 the outputs of which are fed to a differential amplifier 214. In this way, stray signals and leakage are subtracted from the signal that emerges form the differential amplifier 214 on line 216.

Figure 20:
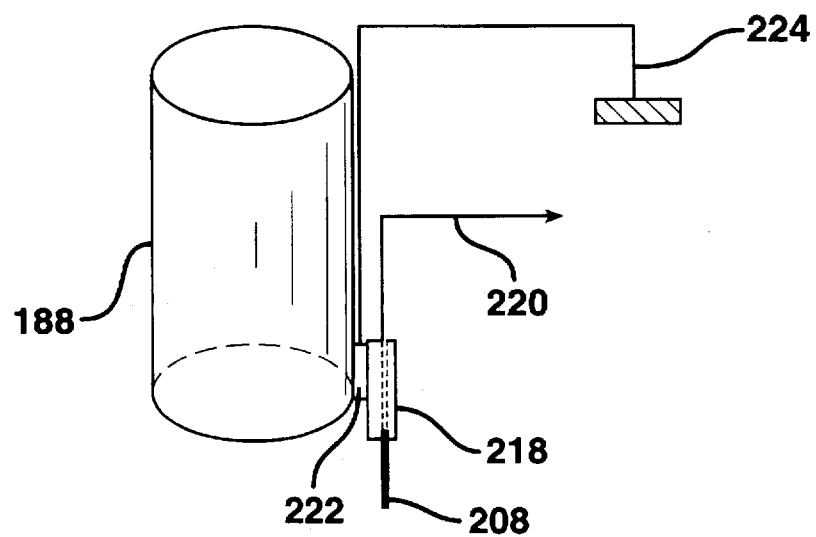
FIG. 20 is a diagram showing the STM tip-holder leakage shield.

Another problem is caused by resistive and capacitative coupling of the large voltages applied to the scanner into the STM tip 208. This may be avoided in the present invention by use of a grounded screen as illustrated in FIG. 20. The tip 208 is mounted into an insulated tube 218 which contains a contact so that the tunnel current signal appears on a wire 220. The tube 218 is mounted onto a metal block 222. This block 222 is connected to an electrical ground 224. The block 222 is, in turn, mounted onto an insulated portion of the scanner tube 188. Thus, any resistive or capacitative leakage of the scanning signal is grounded by the block 222.

Figure 21:
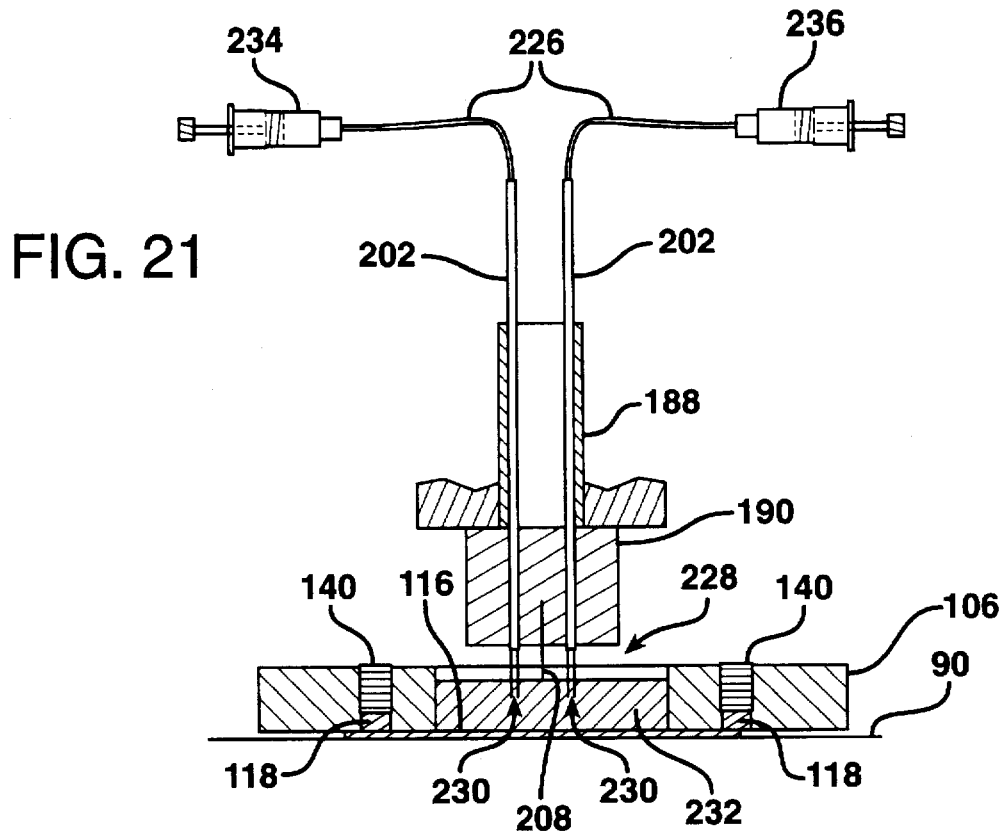
FIG. 21 is a partially cutaway side view of the system showing the STM head assembly lowered into the fluid cell according to the present invention.

The arrangement of the fluid tubes is shown in FIG. 21. Flexible tubes 226 pass down through rigid guide tubes 202 so as to be fed out at the end of the scan extender 190. The flexible tubes 226 are a tight fit in the guide tubes 202 so that leakage from the sample chamber 228 into the scanner is avoided. The guide tubes, while rigid enough to hold the fluid tubes in place, are flexible enough so that the scanning motion of the scanner is not affected. According to a preferred embodiment of the present invention, this is achieved by making the guide tubes from hypodermic stainless steel tubing. The ends 230 of the flexible tubes 226 sit in the fluid cell 106 but do not contact its walls or the sample 116. In this way, the body of the fluid 232 is connected up through the tubes 226 to, for example, fluid contained in two syringes 234, 236. One may be used for injecting the fluid and one may be used for removing it. The flexible tube 226 is easily replaced by pushing new tube into the guide tubes 202. This allows new components to be used in the fluid system as needed to avoid contamination.

Figure 22:
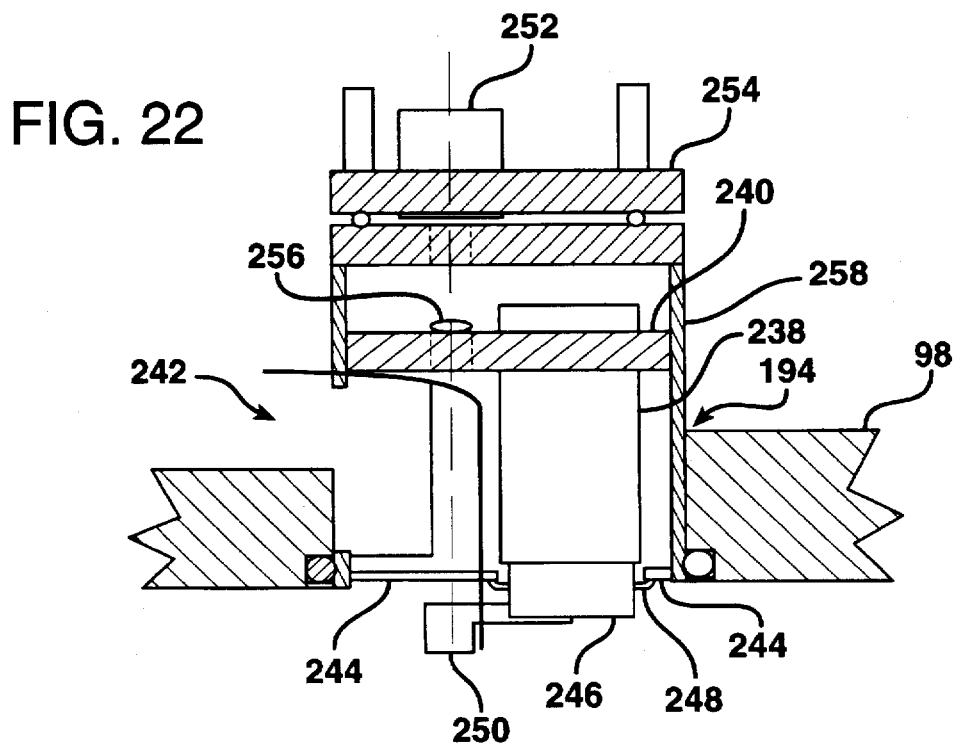
FIG. 22 is a cutaway side view of the AFM head assembly according to the present invention.

The arrangement of the scanning head for AFM is shown in FIGS. 22–25. Referring to FIG. 22, the AFM head has a scanning tube 238 which is similar to the STM scanner and which is located off-center in a cylindrical housing 240. The housing 240 has a side window 242 in order to permit a position sensitive photo detector to be placed within the bore if needed. The position sensitive detector may be equipped, if needed, with a lens to focus the reflected beam on the detector. A transparent disk 244 (or at least a partially transparent disk with the transparent portion adapted to pass the light beam) is used to isolate the bottom of the housing 240 from the sample chamber. It is sealed against the scan extender tube 246 with a flexible rubber seal 248. The seal is similar to that shown in detail for the STM in FIG. 19. The probe-holder 250 is mounted on the scan extender 246. A light source, 252 is located on an angular adjustment mount 254 so as to allow the beam angle of the light beam from light source 252 to be adjusted. The mount 154 sits on top of the scanner housing 240. A lens 256 is placed on a fixture 258 which also holds the scanner tube 238 into the housing 240. The lens 256 focuses the light beam onto the force sensing probe, located in the holder 250.

Figure 23:
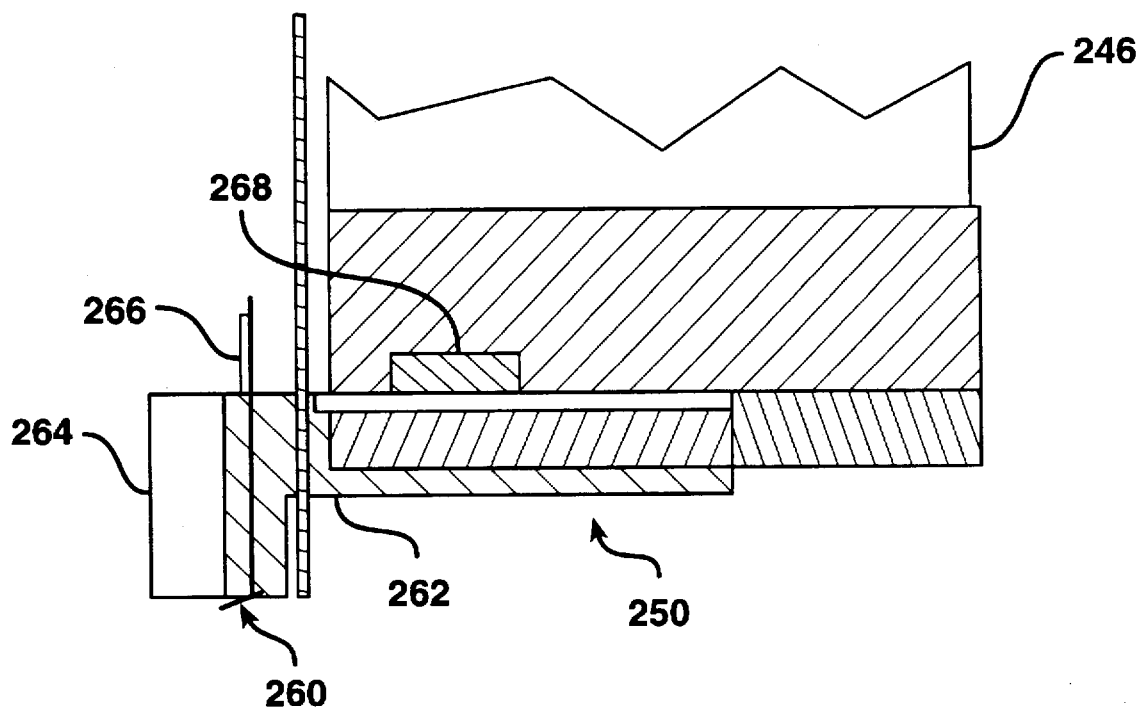
FIG. 23 is a detail of the AFM head assembly showing the holder for the force sensing probe according to the present invention.

The probe holder 250 is shown in FIG. 23. Referring to FIG. 23, the force-sensing probe 260 is mounted on a block 262. In one embodiment, the block 262 is made of an insulating material that is not transparent. The incident and reflected light beams are brought through the liquid meniscus by a small optic or optical element 264. In one embodiment, this is a small glass tube with optically polished ends. The cantilever is held in place by a wire clip 266 that is also used to make electrical contact to a metal layer on the bottom of a force sensor that can be used for the non-contact mode of operation to be described below. Block 262 is held magnetically by magnet 268 which is embedded in scan extender 246. Scan extender 246 preferably has a shallow slot (not shown) to fix the probe holder 250 so it will not rotate horizontally.

Figure 24:
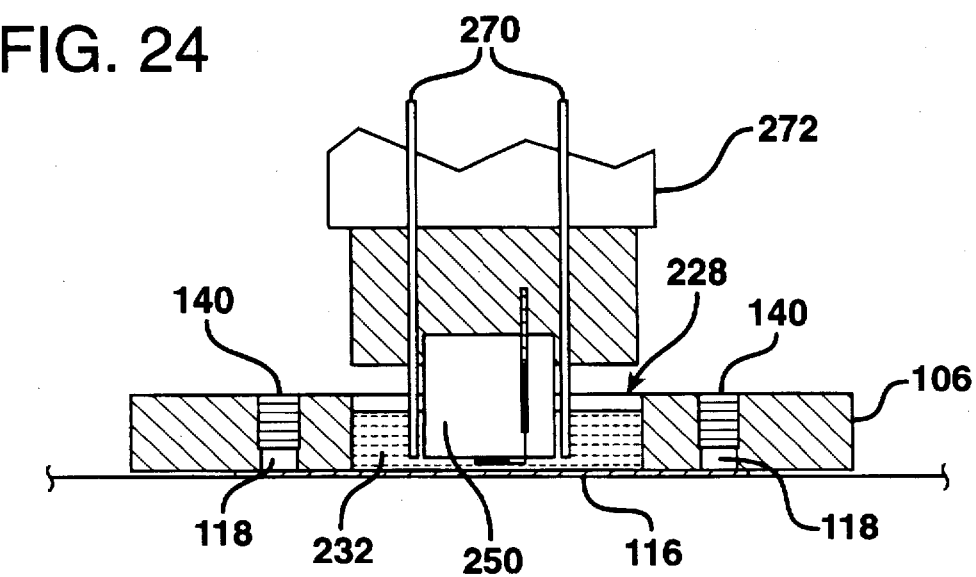
FIG. 24 is a partially cutaway front side view of the AFM head assembly lowered into the fluid cell according to the present invention.

The arrangement of the fluid lines for one embodiment of the AFM scanner is shown in FIG. 24. One or more fluid lines 270 are brought down the side of the scanner 272 and pass through the transparent plate where they form a tight fit to maintain the sealing of the sample chamber. They are located each side of the probe holder 250 and protrude into the fluid cell 106 so as to form a continuous fluid body with the scan assembly without solid contacts between the tubes 270 and the fluid cell 228 or sample 116. In one embodiment, two tubes are used. Fluid is injected into the cell via one of the tubes and extracted by the other. In this way, the fluid cell can be operated in a constant volume condition while the liquid is circulated externally by a peristaltic pump or a pair of coupled syringes, well known to those of ordinary skill in the art. The coupling of the scanner and fluid body permits accurate placement of the tubes without drift owing to strain in the tubes.

Figure 25:
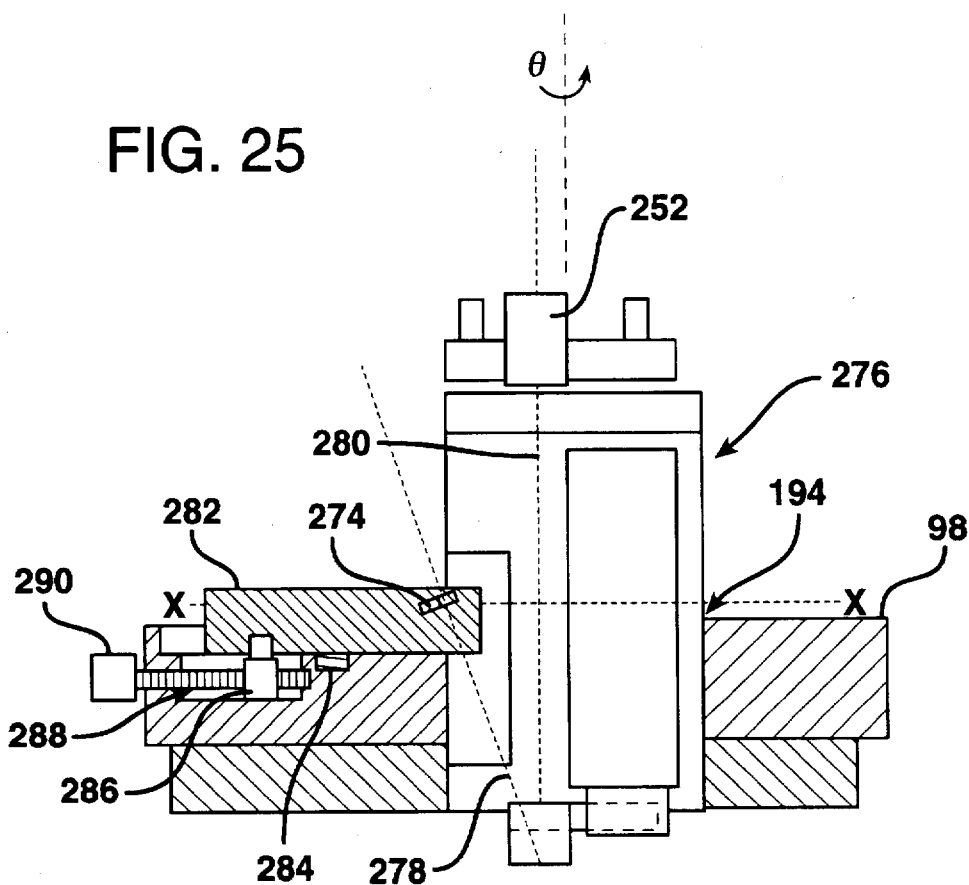
FIG. 25 is a partially cutaway side view of the AFM system showing how a micrometer-driven position sensitive detector mounting block slides on the body block according to the present invention.

FIG. 25 shows the arrangement of the position sensitive detector 274 with respect to the AFM scanning head. Like the STM head, the AFM head 276 sits in a bore 194 in the microscope body 98. It is locked in place with a set screw (not shown) in the body of the microscope, but can be rotated if the set screw is slackened. This axial rotation (θ in FIG. 25) gives one degree of freedom in directing the reflected beam 278 off the force sensing probe. The other degree of freedom is achieved with a uniaxial translation of the position sensitive detector 274 (along the direction "X—X" in FIG. 25). The light beam 280 from the light source 252 is directed onto the probe 260 from where it is reflected up onto the position sensitive detector 274. In doing so, the beam passes through the lens, transparent seal and coupling optic as described above. The position sensitive detector 274 is mounted in a block 282 which is held into a slot in the main body 98 of the microscope. In one embodiment, the block 282 is made from a magnetic material and held down with a small magnet 284 recessed into the body 98 of the microscope for easy removal and replacement. Translation of the block 282 is achieved with the threaded peg 286 that locates into a slot 288 in the block 282 and rides on a micrometer adjustment screw 290 fixed into the body 98 of the microscope. This is conveniently placed between the translation micrometers for the sample-platform positioning pegs as shown in FIG. 14.

Figure 27:
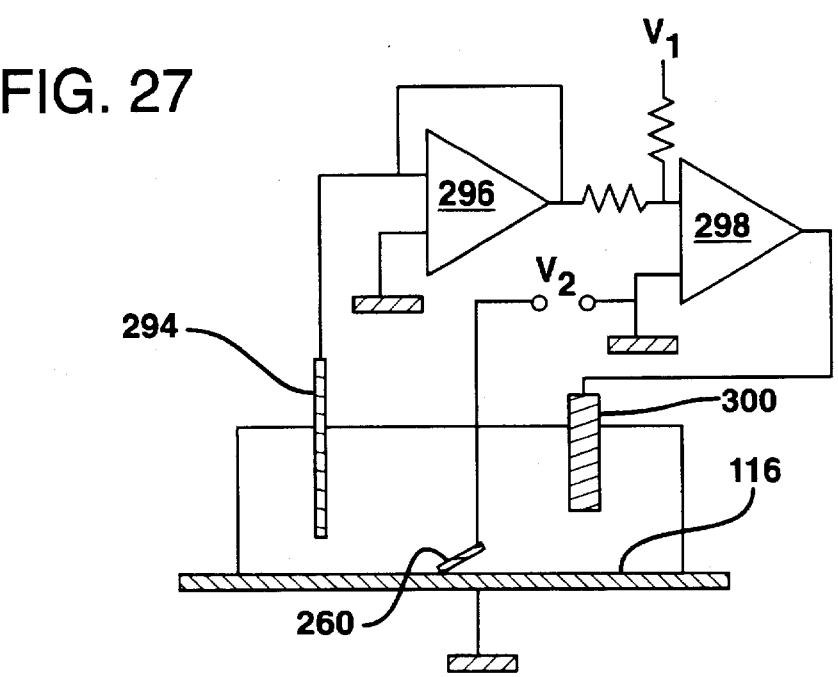
FIG. 27 is a diagram showing the electronic control of the AFM probe and substrate potential according to the present invention.

Prior art for non-contact AFM (Martin et al., J. Appl. Phys., 52, 1455, 1987) uses a resonating cantilever to detect small long-range forces, a technique that will not work in water because the cantilever motion is damped. If, however, attractive surface forces between the probe and the sample are small, the non-contact operation is possible in fluid, as shown by Ohnesorge and Binnig [Science 260, 1451, 1993]. In present invention, these interactions are controlled by controlling the potential of the force-sensing probe. In one embodiment, just the potential of the probe is controlled. In another, the potential of both the probe surface and the sample surface are controlled together. In yet another embodiment, the potential of both the probe surface and the sample surface are independently controlled. These embodiments are illustrated in FIGS. 26–28.

Referring to FIG. 26, the probe 260 is coated with a metal film on the side of the probe that faces the sample 116. The metal film is electrically contacted by a metal clip 266 which is also used to hold the probe in place on the probe holder 262. Light for sensing the deflection of the probe passes into and out of the fluid 232 via the optic 264. The surface charge of the sample 116 and the probe 260 result in an accumulation of an excess concentration of ions 292 at these surfaces. Here, the ions are shown greatly exaggerated in size. If the charge of the probe is adjusted so that the accumulation of excess ions at its surface is of the same sign as the accumulation of excess ions at the sample surface, then the regions of excess ion-concentration will repel each other as they come into contact. This is shown schematically here for a positively charged probe and a positively charged sample. Thus, the excess ion concentrations at each surface carry a net negative charge so that the probe is repelled from the sample surface. The magnitude of this force is altered by adjusting the magnitude of the potential applied to the probe, or to the sample, or to both. Standard electrochemical methods may be used to do this as discussed below. In one embodiment, a probe of fixed charge is used. For example, this may be the charge induced on the surface of a probe because of ionization of its surface on contact with fluid. In this case, the potential of the sample is adjusted so that surface attractive forces are canceled and the probe may be located very close to (but not in contact with) the sample. In another embodiment, the tip is coated with metal as outlined above and its potential controlled so as to achieve the same objective with a sample that is spontaneously charged by contact with fluid. In yet another embodiment, both the sample and the probe are conducting. They may be connected together and their potential with respect to the fluid altered using a potentiostat. Results from such an arrangement are shown in FIG. 28. In yet another embodiment, the potential of both a conducting probe and a conducting sample may be controlled independently. An arrangement for doing this is illustrated in FIG. 27. The potential generated by a reference electrode 294 is buffered by a voltage follower 296 and fed to a potentiostat 298 where an offset voltage $V_1$ is applied. This sets the potential of the substrate 116 via the potential applied to the counter electrode 300 by the potentiostat 298. A separate potential may be applied to the probe 260 by adjusting the voltage $V_2$.

While the most general arrangement is that of a metal coated tip set to one potential and a metal coated substrate set to another potential, it is often advantageous to operate with a metal coated tip under potential control and an insulating surface such as mica. This is because a metal coated tip, in contrast to the standard silicon nitride tips, does not stick to mica. Thus there is no intrinsic adhesion when a metal coated tip is used to scan a mica surface or any surface that retains the basic hydrophilic characteristics of the mica surface. An example would be mica treated with amino propyl triethoxy silane. The tip does not stick to the mica, or to the modified mica at any potential that can be obtained in an aqueous electrolyte. Molecules adsorbed onto the mica may, however, adhere to the tip at some values of the tip potential. Thus, the tip potential is adjusted so as to minimize adhesion of the tip to the molecule. This may be done by recording the adhesive force as the tip is stopped above a molecule and adjusting the tip potential so as to minimize this force. This results in sharper images than could be obtained with a conventional insulating tip not under potential control.

Figure 28:
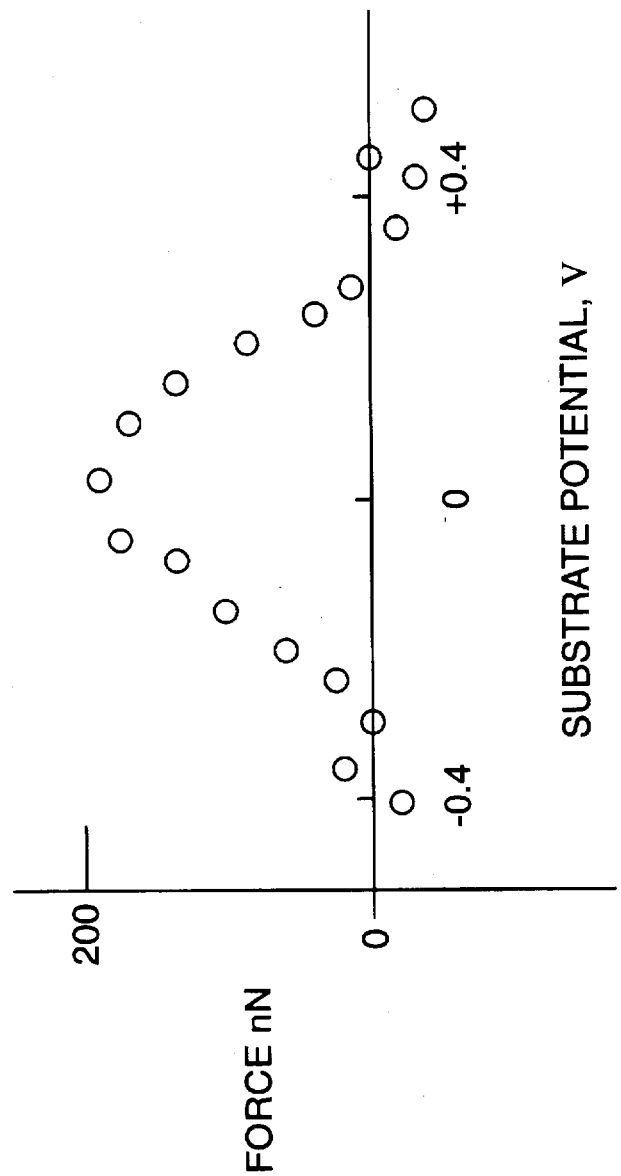
FIG. 28 is a plot showing experimental results for adhesion as a function of the potential of a gold substrate with a gold plated probe at the same potential in an electrolyte in accordance with the present invention.

The action of this control is illustrated in FIG. 28 which shows data obtained for the adhesive force between a gold plated probe and a gold sample surface. Both were submerged in 0.01 molar solution of perchloric acid. Here, the sample and probe were held at the same potential with respect to the fluid ($V_2=0$). The potential scale is adjusted so that zero volts corresponds to the potential for zero charge on the gold surface. This is the potential at which there is no net excess of ions of a particular charge at the surface. The adhesive force was measured by determining the force required to pull the probe free of the sample once it had come into contact with it. At the zero of potential, this force is large (200 nN) because of metallic bonding between the gold plated probe and the gold sample surface. However, as the potential is adjusted away from zero, the adhesion force falls to zero as repulsion between the tip and the sample overcomes the adhesion between the gold tip and the gold sample surface. Gold-plated AFM tips are prepared by thermal evaporation of gold onto standard probe tips (such as those available commercially from Park Scientific of Sunnyvale, Calif.). The film thickness is in the region of 100 Å–500 Å. The probes are preferably pretreated by DC ion sputtering a few angstroms of chrome onto the probes in order to enhance the adhesion of the gold. The thermal evaporation process and ion sputtering process are conventional ones well known to those of ordinary skill in the art. Platinum and palladium may also be substituted for gold.

Figure 29:
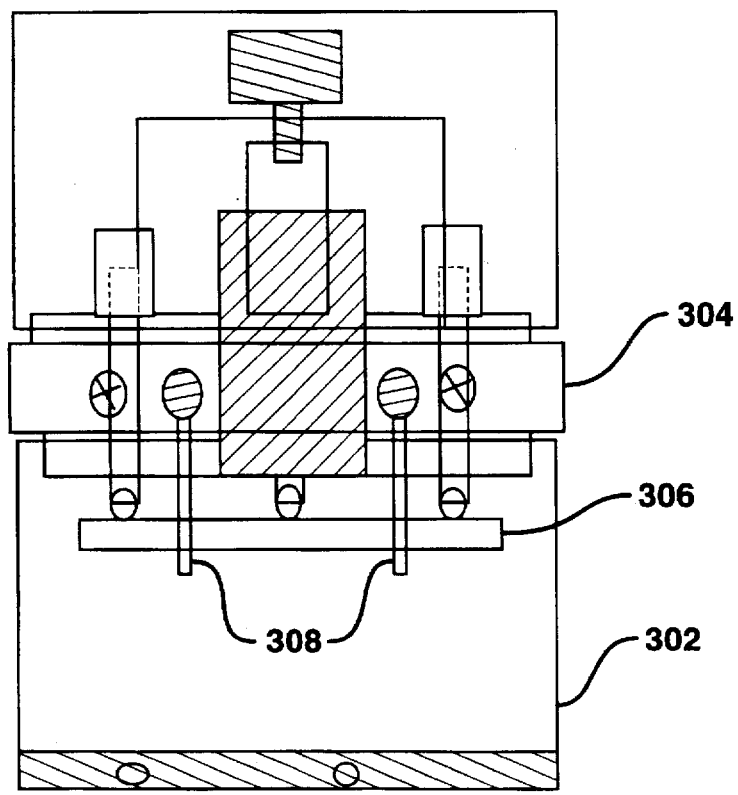
FIG. 29 is a diagram showing another embodiment of the microscope with a removable support.
Figure 30:
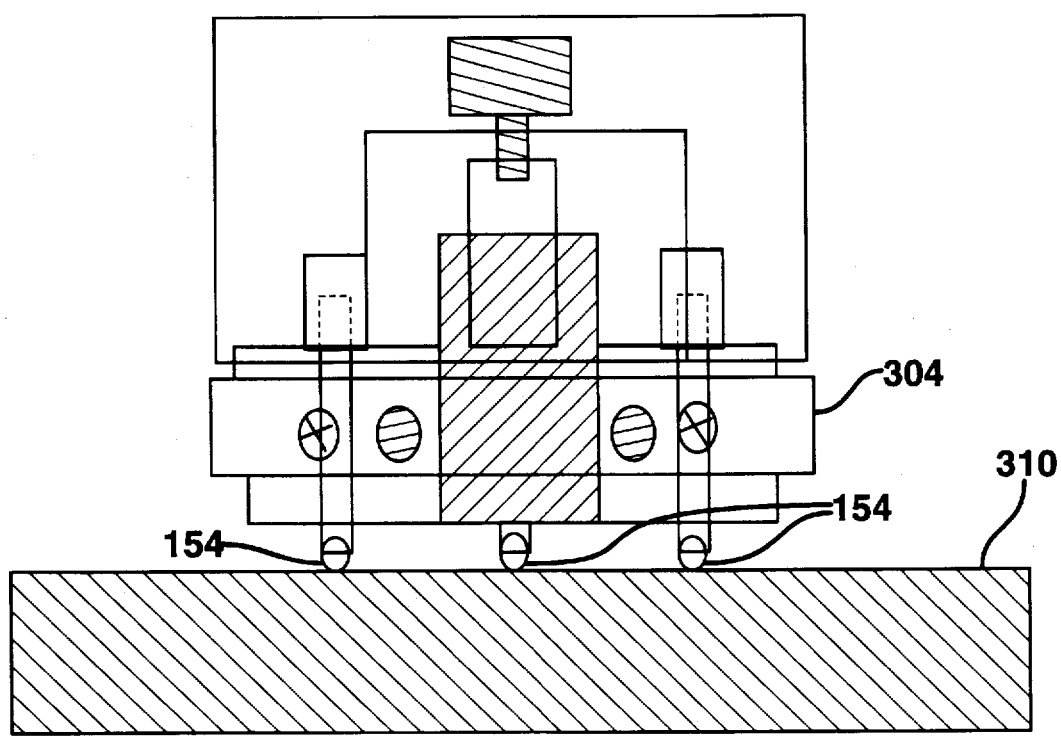
FIG. 30 is a diagram showing the instrument of FIG. 29 with the support removed for operation as a free-standing microscope.

Another embodiment of the microscope is shown in FIG. 29. Here, the frame 102 is replaced by a removable base 302. Removable base 302 is shown here as the glass enclosure, serving both the purpose of an enclosure and a support. However, any other kind of removable support would serve as well. Microscope body 304 is magnetically coupled to x-y sample platform 306 which is adjusted by adjustment pegs 308. The advantage of this embodiment is that a freestanding operation of the microscope is easily obtained. In order to scan a large sample, one has only to remove base 302, the sample platform 306 and the x-y adjustment pegs 308. The microscope will now operate on any surface so as to image that surface. This is further illustrated in FIG. 30. The microscope body 304 is now supported by means of the three magnetic balls 154 on the surface that is to be imaged 310. In this case, the supports do not have to be magnetic. This aspect is required only when operation with the sample platform is desired.

Figure 31A:
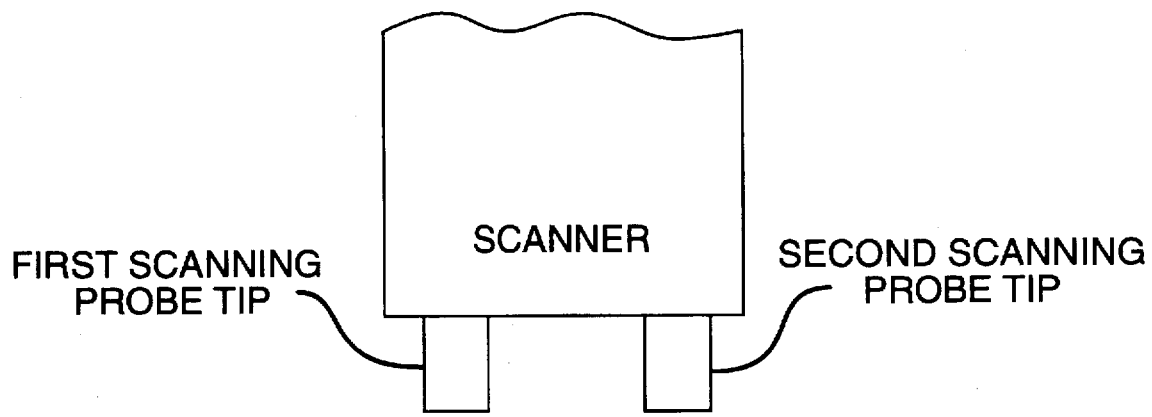
FIG. 31A is a block diagram showing a scanner having two scan probe tips operatively coupled to a free end of a scanner and adapted for simultaneous use.

FIG. 31A is a block diagram showing a scanner having two scan probe tips operatively coupled to a free end of a scanner and adapted for simultaneous use.

Figure 31B:
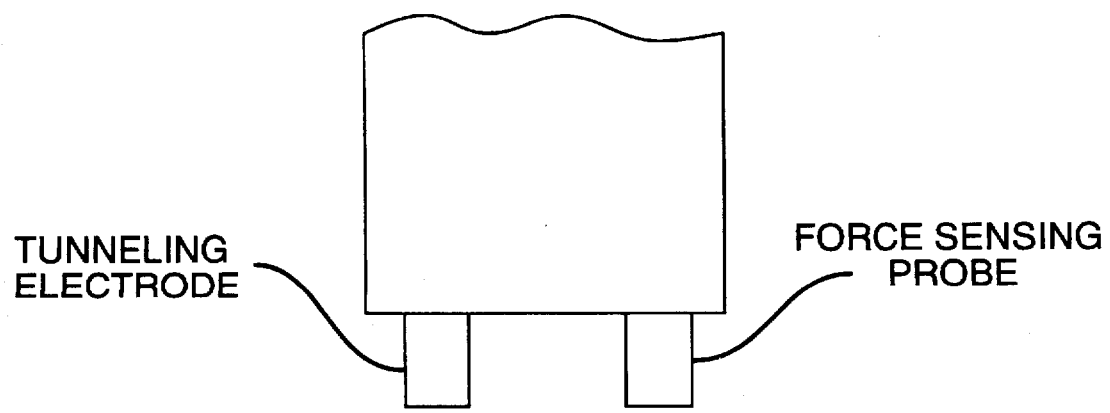
FIG. 31B is a block diagram showing a scanner having two probe tips wherein said scanning probe tip is a tunneling electrode and said second scanning probe tip is a force sensing probe.

FIG. 31B is a block diagram showing a scanner having two probe tips wherein said scanning probe tip is a tunneling electrode and said second scanning probe tip is a force sensing probe.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. An atomic force probe microscope for examining the surface properties of a sample surface, said microscope comprising:
    a frame;
    at least three adjustable support mounts extending downwardly from said frame;
    each of said three adjustable support mounts including a rounded magnetic portion at a distal end thereof;
    a sample stage formed of a material attracted to magnets, said sample stage suspended from said rounded magnetic portions of said support mounts;
    a piezoelectric scanner having a first end and a second end, and attached to said frame at said first end;
    an extender tube coupled to said second end and coupled to an atomic force sensing probe tip; and
    an at least partially optically transparent disk surrounding said extender tube and coupled to said extender tube with a flexible seal.

2. An atomic force microscope according to claim 1 further comprising a fluid cell attached to an upper surface of said sample stage having a fluid chamber open at its top for containing a non-cryogenic fluid body in communication with the sample surface and in which said probe tip may be immersed in close proximity to the sample surface.

3. A scanning tunneling microscope for examining the surface properties of a sample surface, said microscope comprising:
    a frame;
    at least three adjustable support mounts extending downwardly from said frame;
    each of said three adjustable support mounts including a rounded magnetic portion at a distal end thereof;
    a sample stage formed of a material attracted to magnets, said sample stage suspended from said rounded magnetic portions of said support mounts;
    a piezoelectric scanner having a first end and a second end, said scanner attached to said frame adjacent said first end; and
    a block of a conductive material coupled to said second end and coupled to an insulating body from which extends a scanning tunneling microscope tip.

4. A scanning tunneling microscope according to claim 3 further comprising a disk surrounding said scanner and coupled to said scanner with a flexible seal.

5. A scanning tunneling microscope according to claim 4 further comprising a fluid cell attached to an upper surface of said sample stage having a fluid chamber open at its top for containing a non-cryogenic fluid body in communication with the sample surface and in which said microscope tip may be immersed in close proximity to the sample surface.

6. A scanning probe microscope for examining the surface properties of a sample surface, said microscope comprising:
    a frame;
    at least three adjustable support mounts extending downwardly from said frame;
    each of said three adjustable support mounts including a rounded magnetic portion at a distal end thereof;
    a sample stage formed of a material attracted to magnets, said sample stage suspended from said rounded magnetic portions of said support mounts; and a fluid cell having a fluid chamber open at its top for containing a non-cryogenic fluid body in communication with the sample surface and in which a probe may be immersed in close proximity to the sample surface.

7. A scanning probe microscope according to claim 6 further comprising at least one tube coupling said fluid chamber to a fluid reservoir, said tube in contact with and positioned by a piezoelectric scanner having two ends, one of which is mounted to said frame.

8. A scanning probe microscope according to claim 6 where in said fluid cell is attached to said sample stage by a clamp.

9. A scanning probe microscope according to claim 8 wherein said clamp comprises:

a rod having a first end and a second end;

a hole transversely penetrating said rod adjacent said first end;

a pin disposed in said hole, said pin engaging said fluid cell;

a threaded hole longitudinally penetrating said second end of said rod;

a screw engaged in said threaded hole; and a spring disposed between a lower surface of said sample stage and said screw, said spring biasing said fluid cell against an upper surface of said sample stage.

10. A scanning probe microscope for examining the surface properties of a sample surface, said microscope comprising:

a frame;

a scanner element having a first scanner end fixed in operation with respect to said frame and a second scanner end movable relative to said frame in response to signals applied to said scanner element;

a sample stage suspended from said frame under said scanner elements said sample stage being adjustable in position with respect to said frame;

a scanning probe tip operatively coupled to said second scanner end; and a fluid cell having a fluid chamber open at the top for containing a non-cryogenic fluid body in communication with a sample carried on said sample stage and in which said probe tip may be immersed in close proximity to the sample surface.

11. A scanning probe microscope according to claim 10 wherein said sample stage is attached to said frame by slidable magnetic means.

12. A scanning probe microscope according to claim 11 further comprising an x-y displacement mechanism including a pair of non-parallel slots in said sample stage, a pair of adjustment pegs extending from said frame to engage said slots, and adjusting means for independently adjusting the position of said pair of adjustment pegs within a plane defined by an upper surface of said sample stage.

13. A scanning probe microscope according to claim 12 wherein said adjusting means includes a threaded screw drive substantially orthogonal to said pair of adjustment pegs which permits said adjustment pegs to be brought to bear on and move said sample stage and then disengaged after movement is accomplished.

14. A scanning probe microscope according to claim 13 further comprising sensing means for electrically sensing when one or more of said adjustment pegs is in contact with said sample stage.

15. A scanning probe microscope according to claim 12 wherein said pair of adjustment pegs are sized so that their diameters are respectively less than the widths of said pair of slots with which they engage and wherein said slots are perpendicular to one another.

16. A scanning probe microscope for examining the surface properties of a sample surface, said microscope comprising:

a frame;

a sample stage formed of a material attracted to magnets and suspended from said frame by at least three adjustable rods, each of said adjustable rods having first and second ends and each having magnetized elements at their second ends for slidably and magnetically coupling to an upper surface of said sample stage, said sample stage adjustable in position with respect to said frame both by sliding and by vertical movement of said adjustable rods;

a scanner element having a first scanner end fixed in operation with respect to said frame and a second scanner end movable relative to said frame in response to signals applied to said scanner element;

a scanning probe tip operatively coupled to said second scanner end; and a fluid cell having a fluid chamber open at the top for containing a non-cryogenic fluid body in communication with a sample carried on said sample stage and in which said probe tip may be immersed in close proximity to the sample surface.

17. A scanning probe microscope according to claim 16 wherein said magnetized elements have rounded portions for contacting said upper surface of said sample stage.

18. A scanning probe microscope according to claim 17 wherein said upper surface of said sample stage is polished to reduce friction between said rounded portions and said upper surface for smooth translation of the sample in the scanning plane.

19. A scanning probe microscope according to claim 16 further comprising sealing means for hermetically sealing said sample surface, said probe tip and said fluid body to form a sealed chamber while operating the microscope.

20. A scanning probe microscope according to claim 19 wherein said sealing means includes a container sealable against an o-ring seal disposed within a groove in said frame.

21. A scanning probe microscope according to claim 20 wherein said container includes at least one aperture therethrough provided for the controlled introduction of gasses, fluids or vapors into said sealed chamber.

22. A scanning probe microscope according to claim 16 further comprising a fluid reservoir and at least one tube provided for carrying fluid, a first end of said tube communication with said fluid reservoir and a second end of said tube communicating with said fluid cell, said second end of said tube positioned by said scanner element.

23. A scanning probe microscope according to claim 16 further including means for locking at least one of said adjustable rods in place.

24. A scanning probe microscope according to claim 16 wherein said magnetized elements comprise steel balls in contact with permanent magnets.

25. A scanning probe microscope according to claim 16 further comprising at least one electrode having an end extending into said fluid chamber.

26. A scanning probe microscope according to claim 25 wherein at least one of said electrodes is attached to an insulating block with spring-loaded clips, said insulating block being in turn attached to said sample stage.

27. A scanning probe microscope according to claim 16 wherein at least one of said adjustable rods further comprises a slot cut along its length and into its body and a nut at its first end engaged with a threaded portion of said adjustable rod at its first end and wherein said frame includes a pin located in a bore for engaging said slot and preventing rotation of said adjustable rod, said adjustable rod being vertically translatable through rotation of said nut.

28. A scanning probe microscope according to claim 16 wherein said scanner element and said scanning probe tip comprise a scanning head which is detachable from said frame without further disassembly of the microscope.

29. A scanning probe microscope according to claim 28 wherein said scanning head has a cylindrical cross-sectional shape that is engaged and rotated within a cylindrical bore in said frame, facilitating physical alignment of the probe.

30. A scanning probe microscope according to claim 29 wherein said cylindrical bore receives either an STM scanner or an AFM scanner, each of said scanners being interchangeable by virtue of having the same diameter.

31. A scanning probe microscope according to claim 16 wherein said fluid cell further comprises at least two vertical apertures communicating with the sample surface to allow the continuity of electrical contact to the sample surface to be checked.

32. A scanning probe microscope according to claim 16 wherein said scanning probe tip is a force sensing probe.

33. A scanning probe microscope according to claim 32 in which light from a collimated light source mounted to said frame is communicated to and from said force sensing probe through said fluid body by an optical element to which said force sensing probe is not directly attached.

34. A scanning probe microscope according to claim 32 further comprising means for controlling the potential of said force sensing probe.

35. A scanning probe microscope according to claim 32 further comprising a position-sensitive photo detector positioned by translation on said frame of the microscope.

36. A scanning probe microscope according to claim 16 wherein said scanning probe tip is a tunneling electrode.

37. A scanning probe microscope according to claim 36 further comprising means for controlling the potential of said tunneling electrode.

38. A scanning probe microscope according to claim 36 where a signal-carrying wire from said tunneling electrode to a preamplifier is accompanied by a second wire arranged so that stray pick up and leakage common to both wires is canceled from the signal.

39. A scanning probe microscope according to claim 16 further comprising means for controlling the potential of said sample surface.

40. A scanning probe microscope according to claim 16 further comprising a second scanning probe tip operatively coupled to said second scanner end, said second scanning probe tip is for simultaneous use with said scanning probe tip.

41. A scanning probe microscope according to claim 40 wherein said scanning probe tip is a tunneling electrode and said second scanning probe tip is a force sensing probe.

42. A scanning probe microscope for examining the surface properties of a sample surface, said microscope comprising:
   a frame;
   a sample stage adjustable in position with respect to said frame;
   a scanner element having a first scanner end fixed in operation with respect to said frame and a second scanner end movable relative to said frame in response to signals applied to said scanner element;
   a scanning probe tip operatively coupled to said second scanner end;
   a fluid cell having a fluid chamber open at the top for containing a non-cryogenic fluid body in communication with a sample carried on said sample stare and in which said probe tip may be immersed in close proximity to the sample surface; and
   a means for hermetically sealing said sample surface, said probe tip and said fluid cell while operating the microscope.

43. A scanning probe microscope for examining the surface properties of a sample surface, said microscope comprising:
   a frame;
   a sample stage adjustable in position with respect to said frame;
   a scanner element having a first scanner end fixed in operation with respect to said frame and a second scanner end movable relative to said frame in response to signals applied to said scanner element;
   a scanning probe tip operatively coupled to said second scanner end; and
   a fluid cell having a fluid chamber open at the top for containing a non-cryogenic fluid body in communication with a sample carried on said sample stage and in which said probe tip may be immersed in close proximity to the sample surface, said fluid cell is magnetically mounted to an upper surface of said sample stage, and wherein said fluid cell includes at least one threaded bore therethrough and said threaded bore includes a magnet, the position of which in said bore is adjustable to adjust the magnetic force of attraction between said fluid cell and said sample stage.

44. A scanning probe microscope for examining the surface properties of a sample surface, said microscope comprising:
   a frame;
   a sample stage adjustable in position with respect to said frame;
   a scanner element having a first scanner end fixed in operation with respect to said frame and a second scanner end movable relative to said frame in response to signals applied to said scanner element;
   a scanning probe tip operatively coupled to said second scanner end;
   a fluid cell having a fluid chamber open at the top for containing a non-cryogenic fluid body in communication with a sample carried on said sample stage and in which said probe tip may be immersed in close proximity to the sample surface; and
   a fluid reservoir and at least one tube provided for carrying fluid, a first end of said tube communicating with said fluid reservoir and a second end of said tube communicating with said fluid cell, said second end of said tube positioned by said scanner element.

45. A scanning probe microscope for examining the surface properties of a sample surface, said microscope comprising:
   a frame;
   a sample stage adjustable in position with respect to said frame;
   a scanner element having a first scanner end fixed in operation with respect to said frame and a second scanner end movable relative to said frame in response to signals applied to said scanner element;

a scanning probe tip operatively coupled to said second scanner end;

a fluid cell assembly having a fluid chamber open at the top for containing a non-cryogenic fluid body in communication with a sample carried on said sample stage and in which said probe tip may be immersed in close proximity to the sample surface; and at least one electrode having an end extending into said fluid chamber, wherein at least one of said electrodes is attached to an insulating block with spring-loaded clips, said insulating block being in turn attached to said sample stage.

46. A scanning probe microscope for examining the surface properties of a sample surface, said microscope comprising:

a frame;

a sample stage adjustable in position with respect to said frame;

a scanner element having a first scanner end fixed in operation with respect to said frame and a second scanner end movable relative to said frame in response to signals applied to said scanner element;

a scanning probe tip operatively coupled to said second scanner end; and a fluid cell having a fluid chamber open at the top for containing a non-cryogenic fluid body in communication with a sample carried on said sample stage and in which said probe tip may be immersed in close proximity to the sample surface, said fluid cell also having at least two vertical apertures communicating with the sample surface to allow the continuity of electrical contact to the sample surface to be checked.

47. A scanning probe microscope for examining the surface properties of a sample surface, said microscope comprising:

a frame;

a sample stage adjustable in position with respect to said frame;

a scanner element having a first scanner end fixed in operation with respect to said frame and a second scanner end movable relative to said frame in response to signals applied to said scanner element;

a tunneling electrode scanning probe tip operatively coupled to said second scanner end;

a fluid cell having a fluid chamber open at the top for containing a non-cryogenic fluid body in communication with a sample carried on said sample stage and in which said probe tip may be immersed in close proximity to the sample surface; and where a signal-carrying wire from said tunneling electrode scanning probe tip to a preamplifier is accompanied by a second wire connected to a second preamplifier arranged so that stray pick up and leakage common to both wires is canceled from the signal.

48. A scanning tunneling microscope for examining the surface properties of a sample surface, said microscope comprising:

a frame;

a sample stage suspended from said frame;

a piezoelectric scanner having a first end and a second end, said scanner attached to said frame, said second end being free to move in response to electrical signals applied to said scanner;

a grounded element formed of an electrically conductive material attached to a non-conductive portion of said scanner adjacent said second end;

an electrically insulated tunneling probe tip holder coupled to said grounded element; and a tunneling probe tip extending from said tunneling probe tip holder.

49. An atomic force probe microscope for examining the surface properties of a sample surface, said microscope comprising:

a frame;

at least three adjustable support mounts extending downwardly from said frame;

each of said three adjustable support mounts including a rounded magnetic portion at a distal end thereof;

a sample stage formed of a material attracted to magnets, said sample stage suspended from said rounded magnetic portions of said support mounts;

a piezoelectric scanner having a first end and a second end, and attached to said frame at said first end; and an extender tube coupled to said second end and coupled to an atomic force sensing probe tip.

* * * * *